(12) United States Patent
Ferreiro Gil et al.

(10) Patent No.: US 12,492,180 B2
(45) Date of Patent: Dec. 9, 2025

(54) PROCESS AND INTERMEDIATES FOR THE PREPARATION OF VOXELOTOR

(71) Applicant: CURIA SPAIN, S.A.U., Valladolid (ES)

(72) Inventors: Juan José Ferreiro Gil, Boecillo-Valladolid (ES); Jesús Miguel Iglesias Retuerto, Boecillo-Valladolid (ES); Antonio Lorente Bonde-Larsen, Boecillo-Valladolid (ES)

(73) Assignee: CURIA SPAIN, S.A.U., Boecillo (ES)

( * ) Notice: Subject to any disclaimer, the term of this patent is extended or adjusted under 35 U.S.C. 154(b) by 1003 days.

(21) Appl. No.: 17/416,983

(22) PCT Filed: Dec. 20, 2019

(86) PCT No.: PCT/EP2019/086606
§ 371 (c)(1),
(2) Date: Jun. 21, 2021

(87) PCT Pub. No.: WO2020/127924
PCT Pub. Date: Jun. 25, 2020

(65) Prior Publication Data
US 2022/0073493 A1    Mar. 10, 2022

(30) Foreign Application Priority Data

Dec. 21, 2018 (EP) .................................... 18382986

(51) Int. Cl.
*C07D 401/04*    (2006.01)
(52) U.S. Cl.
CPC ................... *C07D 401/04* (2013.01)
(58) Field of Classification Search
CPC .................................................. C07D 401/04
See application file for complete search history.

(56) References Cited

U.S. PATENT DOCUMENTS

2015/0209443 A1   7/2015   Metcalf

FOREIGN PATENT DOCUMENTS

| EP | 1911738 A1 | 4/2008 | |
|---|---|---|---|
| WO | 2007/067615 A2 | 6/2007 | |
| WO | 2013/102142 A1 | 7/2013 | |
| WO | WO-2014150258 A1 * | 9/2014 | ............... A61P 7/06 |
| WO | 2015/031285 A1 | 3/2015 | |
| WO | 2017/197083 A1 | 11/2017 | |
| WO | 2017/218960 A1 | 12/2017 | |

OTHER PUBLICATIONS

Liang et al., "Advances in Synthesis Method of Weinreb Amide," Heilongjiang Science and Technology Information 13:37-38 (2015) (English Abstract attached).
International Search Report and Written Opinion for corresponding Application No. PCT/EP2019/086606 (mailed Feb. 10, 2020).
Miah et al., "Directed Ortho-Metalation of Aryl Amides, O-Carbamates, and Methoxymethoxy Systems: Directed Metalation Group Competition and Cooperation," Europe J. Org. Chem. 2018(4):447-454 (2017).
Riggs et al., "Anionic Snieckus-Fries Rearrangement: Solvent Effects and Role of Mixed Aggregates," J. Am. Chem. Soc. 130(4):13709-13717 (2008).
Database Registry: Chemical Abstracts Service (Columbus, Ohio) Database accession No. 1697989-05-1 (2015).
Metcalf et al., "Discovery of GBT440, an Oraly Bioavailable R-State Stabilizer of Sickle Cell Hemoglobin," ACS Med. Chem. Lett. 8(3):321-326 (2017).
Spletstoser et al., "Mild and Selective Hydrozirconation of Amides to Aldehydes Using Cp2Zr(H)Cl: Scope and Mechanistic Insight," J. Am. Chem. Soc. 129(11):3408-3419 (2007).
Database Registry: Chemical Abstracts Service (Columbus, Ohio) Database accession No. 2027389-58-6 (2016).

* cited by examiner

*Primary Examiner* — Andrew D Kosar
*Assistant Examiner* — Phillip Matthew Rzeczycki
(74) *Attorney, Agent, or Firm* — Troutman Pepper Locke LLP (Rochester)

(57) ABSTRACT

The invention relates to a process for the preparation of Voxelotor, or a salt or solvate thereof, which comprises the use of a compound of formula (I) or (I'), or a salt or solvate thereof.

9 Claims, 3 Drawing Sheets

PROCESS AND INTERMEDIATES FOR THE PREPARATION OF VOXELOTOR

This application is a national stage application under 35 U.S.C. § 371 of PCT Application No. PCT/EP2019/086606, filed Dec. 20, 2019, which claims the benefit of Europe Patent Application Serial No. 18382986.0, filed Dec. 21, 2018, which are hereby incorporated by reference in their entirety.

FIELD OF THE INVENTION

The invention relates to a process for the preparation of Voxelotor and derivatives thereof and to intermediates useful in the synthesis of these compounds.

BACKGROUND OF THE INVENTION

Voxelotor and pharmaceutical compositions comprising it are suitable as allosteric modulators of hemoglobin, for their use in treating disorders mediated by hemoglobin and disorders that would benefit from tissue and/or cellular oxygenation.

Sickle cell disease is a group of disorders that affects hemoglobin, the molecule in red blood cells that delivers oxygen to cells throughout the body. People with this disorder have atypical hemoglobin molecules called hemoglobin S, which can distort red blood cells into a sickle, or crescent, shape. When red blood cells sickle, they break down prematurely, which can lead to anemia. Anemia can cause shortness of breath, fatigue, and delayed growth and development in children.

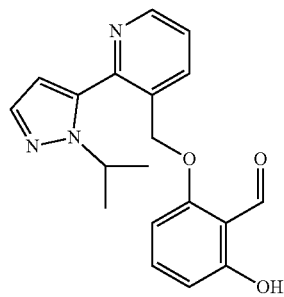

Voxelotor

Several synthetic processes for preparing Voxelotor and intermediates thereof have been disclosed.

Preparation of Voxelotor was first disclosed in WO 2013/102142. The process disclosed therein requires several synthetic steps for preparing the pyrazole ring and further chromatographic separation of the resulting isomers. Voxelotor is finally obtained through alkylation of the chloride derivative with 2,6-dihydroxy-benzaldehyde.

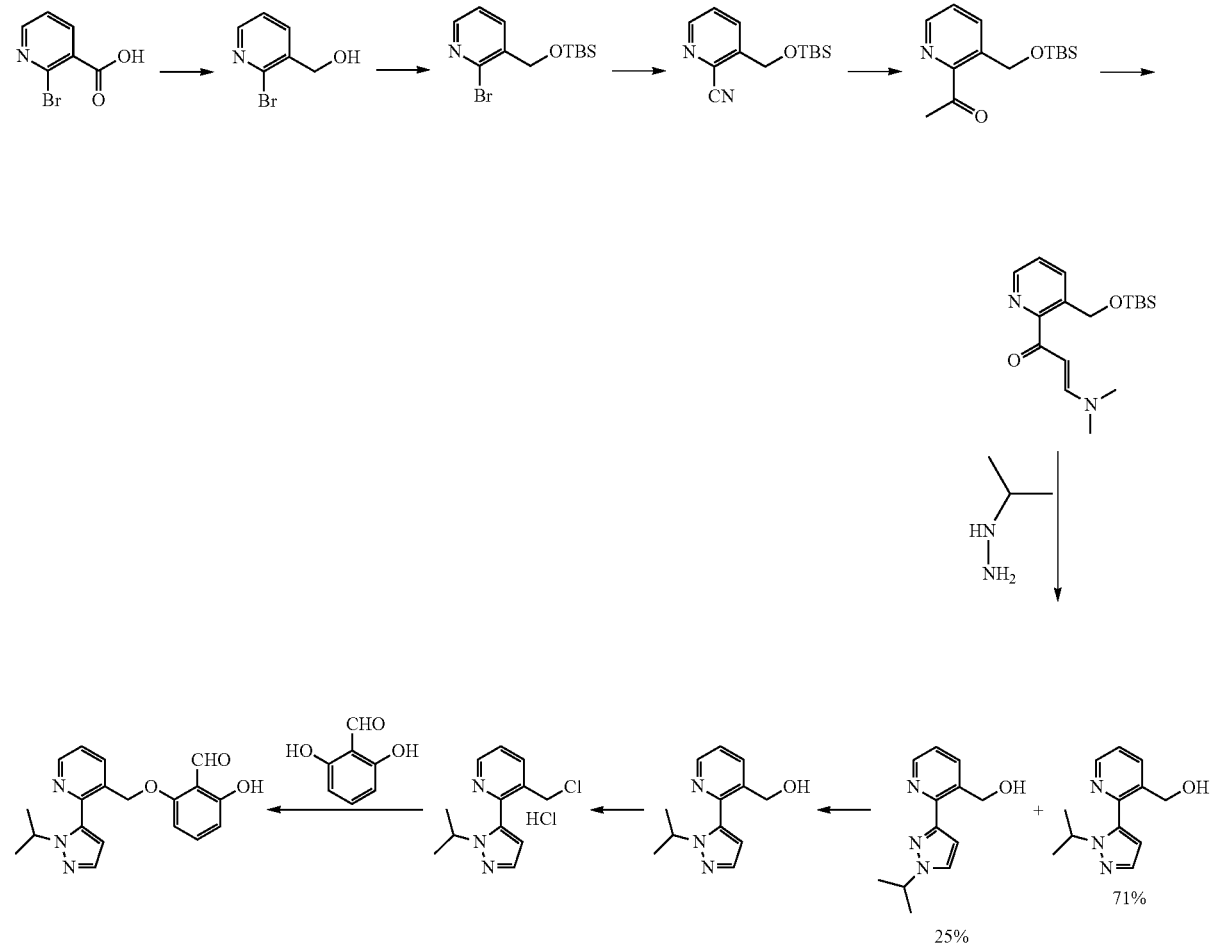

WO 2014/150276 discloses a more straightforward process for preparing the intermediate in the synthesis of Voxelotor (INT-4) comprising a Suzuki cross-coupling reaction.

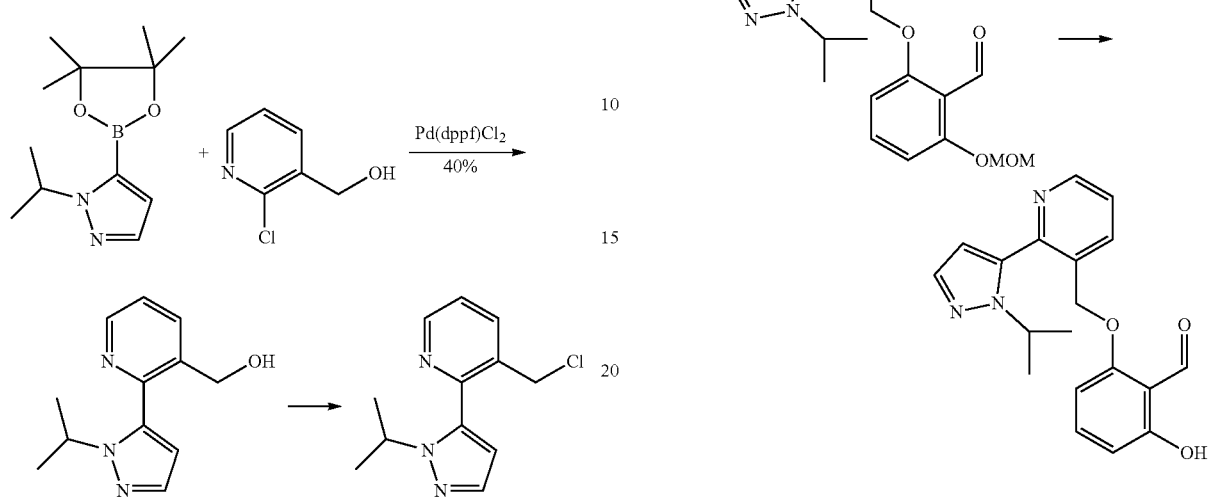

Documents WO 2015/031285 and ACS Medicinal Chemistry Letters 2017, 8(3), 321-326 disclose the use of mono-protected 2,6-dihydroxy-benzaldehyde in order to avoid bis-alkylation side products.

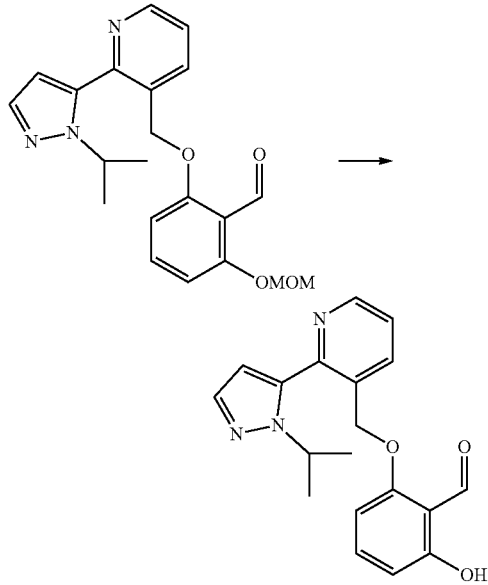

The mono-protected compound can be obtained through a multi-step sequence from resorcinol or from bromo-resorcinol.

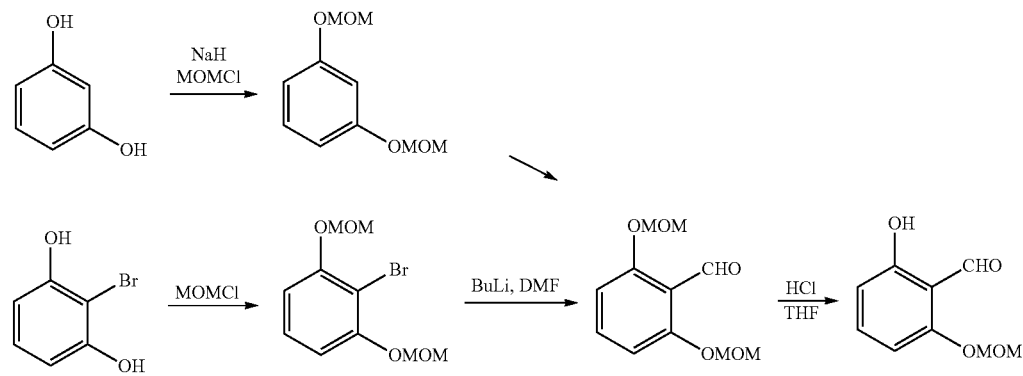

These documents also describe introduction of the phenyl ether through Mitsunobu reaction.

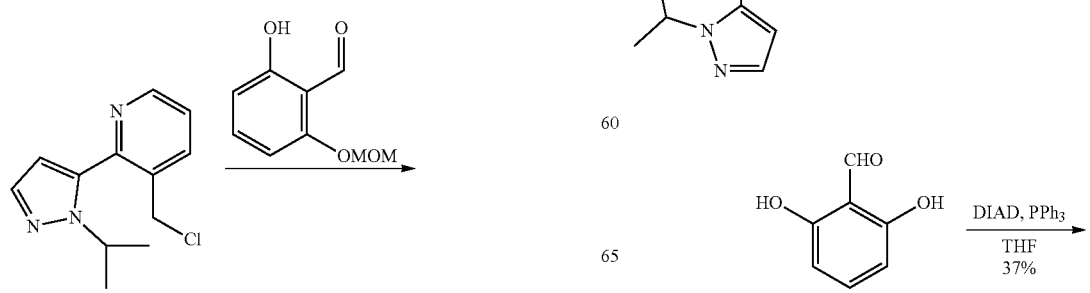

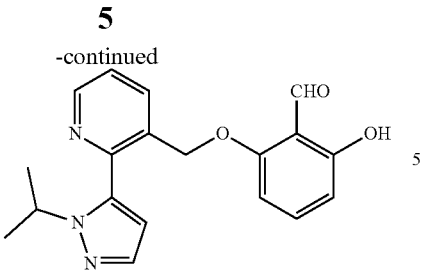

WO2017/197083 refers to a process for the synthesis of 2,6-dihydroxy-benzaldehyde, comprising the use of branched protecting groups to suppress unwanted polymerization and decomposition reactions. Subsequent conversion of 2,6-dihydroxy-benzaldehyde into Voxelotor is also disclosed.

Document US2015/0209443 discloses the preparation of compounds structurally related to Voxelotor.

Though several processes for the preparation of Voxelotor and intermediates thereof have been disclosed, they require many synthetic steps and/or give rise to the desired product in low yield.

Additionally, the processes disclosed up to now for the preparation of Voxelotor require the use of 2,6-dihydroxy-benzaldehyde, which leads to bis-alkylation side products and low yields, or its mono-protected derivative, which is expensive and require several synthetic steps to be obtained.

It is therefore necessary to develop a new process for obtaining Voxelotor as well as key intermediates in its synthesis which overcome all or part of the problems associated with the known processes belonging to the state of the art.

SUMMARY OF THE INVENTION

The invention faces the problem of providing a new process for the preparation of Voxelotor and intermediates thereof which does not require the use of 2,6-dihydroxy-benzaldehyde or its mono-protected derivative. In particular, the inventors have found that compounds of formula (I) and (I') can be efficiently used as intermediates in the synthesis of Voxelotor. Therefore, the invention refers to the use of a compound of formula (I) or (1'), or salts or solvates thereof, as an intermediate in the synthesis of Voxelotor, or a salt or solvate thereof.

Compounds of formula (I) and (I') can be readily obtained from 2,6-dihydroxybenzoic acid, for instance, as disclosed in Organic Letters 2000, 2(23), 3731-3734, in Organic Process Research and Development 2016, 20(2), 233-241, or as disclosed herein below. 2,6-dihydroxybenzoic acid is a very inexpensive compound and so compounds of formula (I) and (I') according to the invention can be obtained in a very cheap and easy way. Additionally, the synthesis of Voxelotor according to the invention leads to the desired compounds in high purity even without the need of column chromatography. Therefore, the process of the present invention for the synthesis of Voxelotor is very convenient and is suitable for its industrial application.

Accordingly, in a first aspect the invention is directed to the use of a compound of formula (I) or (I')

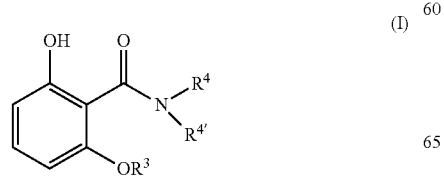

(I)

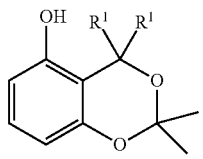

(I')

or a salt or solvate thereof, wherein
R³ represents hydrogen or a hydroxyl protecting group,
R⁴ and R⁴' are independently selected from $C_{1-6}$ alkyl and $C_{1-6}$ alkoxyl, and
each R¹ is hydrogen or they form, together with the carbon atom to which they are attached, an oxo group;
in the preparation of Voxelotor, or a salt or solvate thereof.

In a second aspect the invention is directed to a process for preparing Voxelotor, or a salt or solvate thereof, comprising:
(a) reacting a compound of formula (I) or (I')

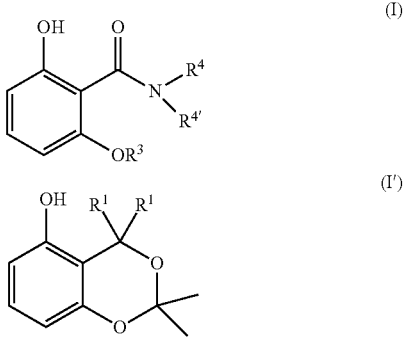

or a salt or solvate thereof, wherein
R³ represents hydrogen or a hydroxyl protecting group,
R⁴ and R⁴' are independently selected from $C_{1-6}$ alkyl and $C_{1-6}$ alkoxyl, and
each R¹ is hydrogen or they form, together with the carbon atom to which they are attached, an oxo group;
with a compound of formula (II) or (III)

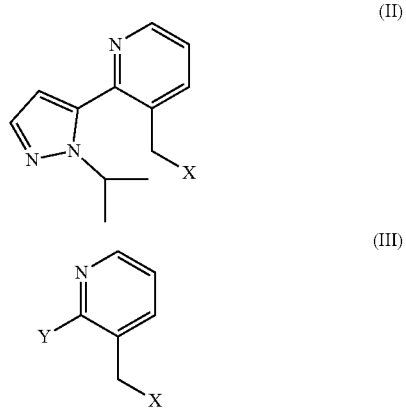

or a salt or solvate thereof, wherein
X is selected from OH, Cl, Br, I, OTf, OTs and OMs, and
Y is selected from Cl, Br, I, OTf and OMs;
to obtain a compound of formula (IV)/(IV') or (V)/(V') respectively

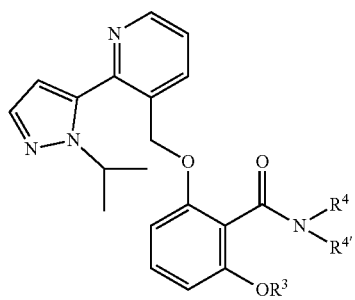
(IV)
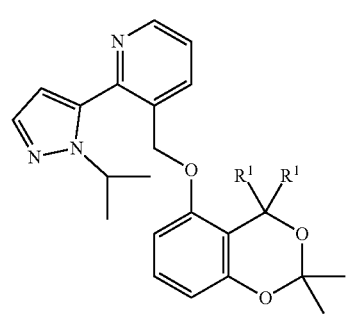
(IV')
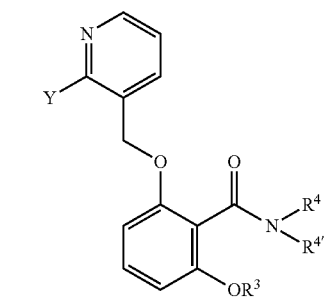
(V)
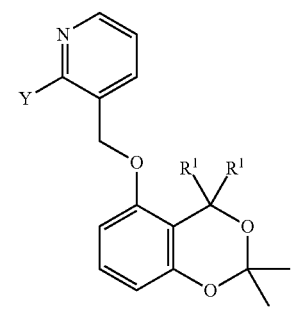
(V')
or a salt or solvate thereof; and
(b) converting the compound of formula (IV)/(IV') or (V)/(V'), or a salt or solvate thereof, into Voxelotor or a salt or solvate thereof.
In a third aspect the invention is directed to a compound selected from the group consisting of:
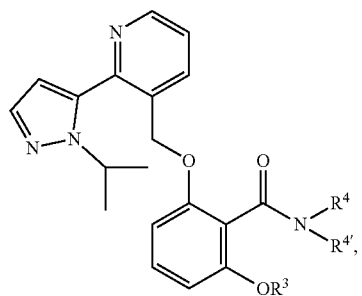
(IV)
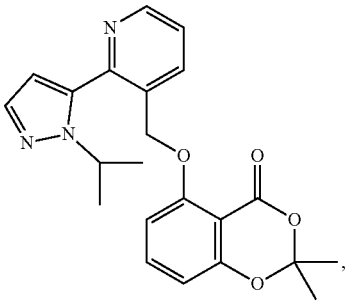
(V)
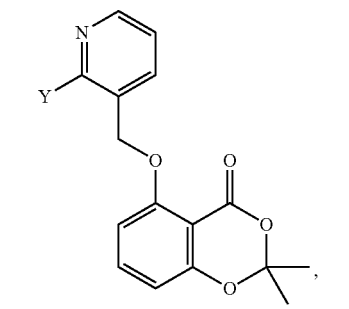
(IV'A)
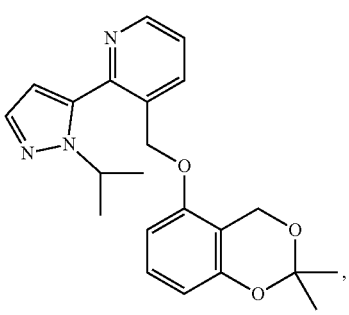
(V'A)
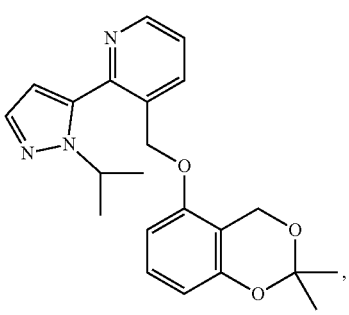
(IV'B)

-continued

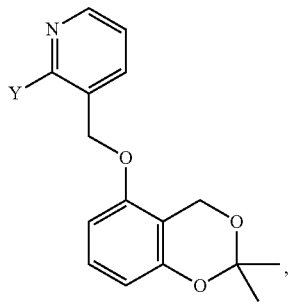
(V'B)

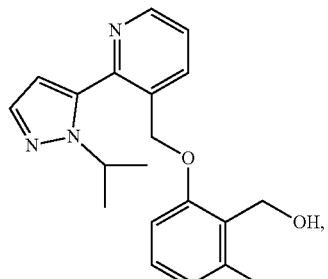
(VI)

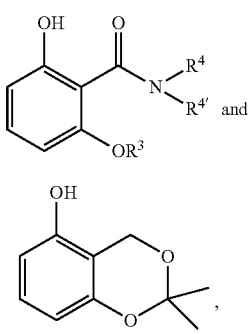
(I)

(I'B)

or a salt or solvate thereof, wherein
Y is selected from Cl, Br, I, OTf and OMs,
$R^3$ represents hydrogen or a hydroxyl protecting group, and
in the compound of formula (IV) and (V) $R^4$ and $R^{4'}$ are each independently
selected from $C_{1-6}$ alkyl and $C_{1-6}$ alkoxyl, and in the compound of formula (I) $R^4$ is
$C_{1-6}$ alkyl and $R^{4'}$ is $C_{1-6}$ alkoxyl;
with the proviso that the compound of formula (I) is not 2-hydroxy-N,6-dimethoxy-N-methyl-benzamide and 2,6-dihydroxy-N-methoxy-N-mehyl-benzamide.

DETAILED DESCRIPTION OF THE INVENTION

Figure 1:
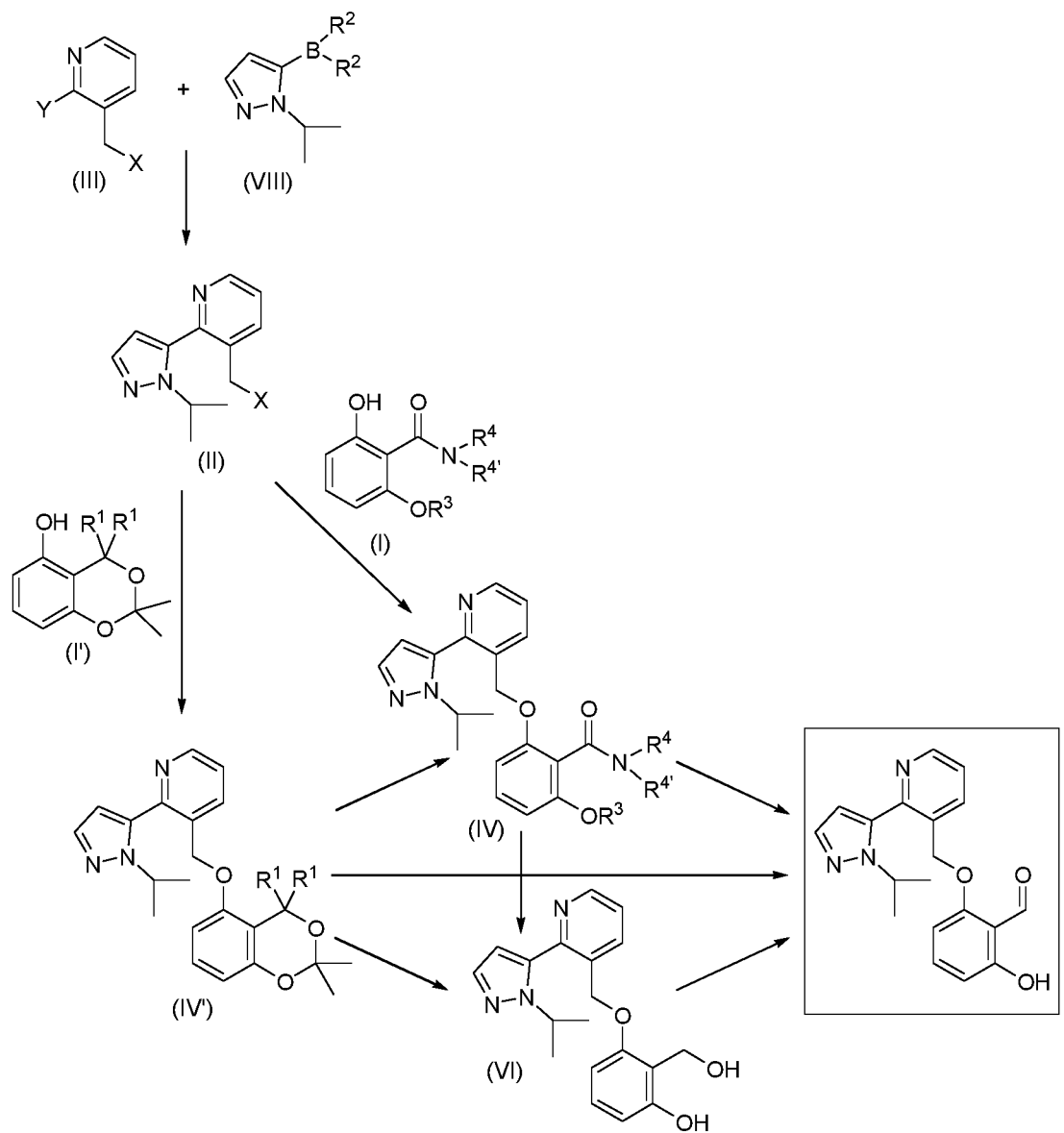
FIG. 1. Scheme with processes for preparing Voxelotor according to the invention (Route A).
Figure 2:
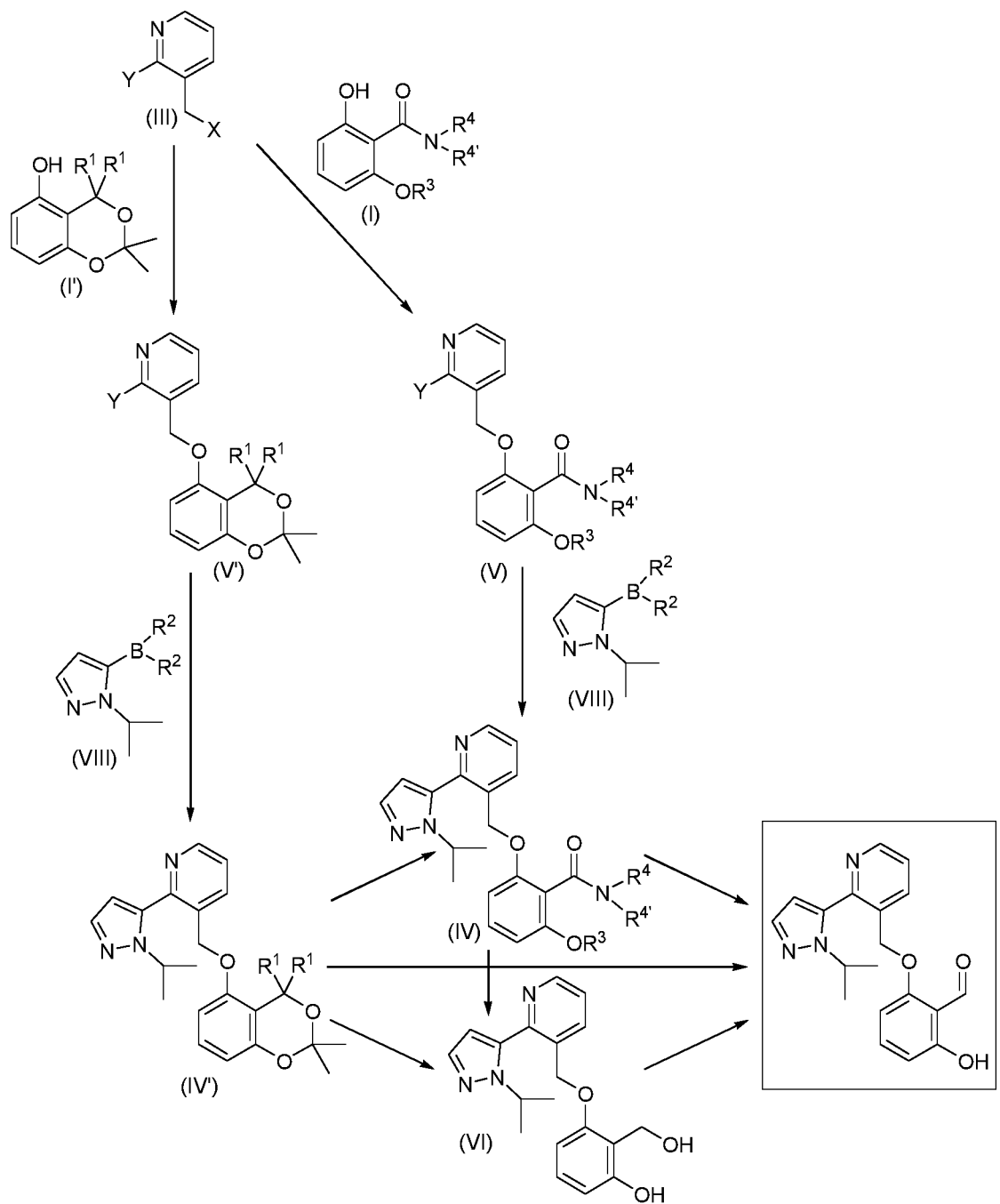
FIG. 2. Scheme with processes for preparing Voxelotor according to the invention (Route B).
Figure 3:
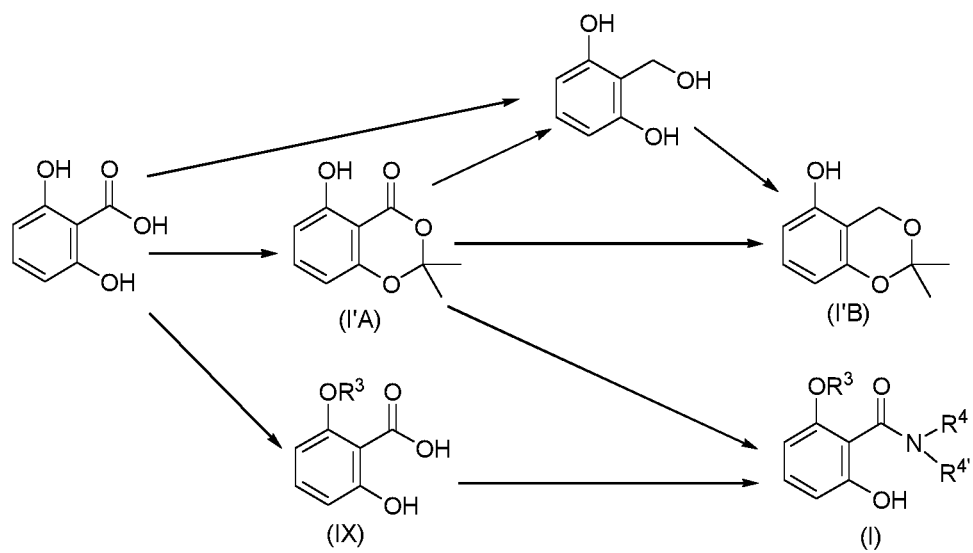
FIG. 3. Synthesis of compounds (I) and (I') according to the invention.

The term "$C_1$-$C_6$ alkyl" refers to a linear or branched alkane derivative containing from 1 to 6, preferably from 1 to 3 ("$C_1$-$C_3$ alkyl"), carbon atoms and which is bound to the rest of the molecule through a single bond. Illustrative examples of alkyl groups include methyl, ethyl, n-propyl, i-propyl, n-butyl, i-butyl, t-butyl, pentyl, hexyl. Preferably, it is methyl or ethyl.

The term "$C_3$-$C_7$ cycloalkyl" refers to a radical derived from cycloalkane containing from 3 to 7, preferably from 3 to 6 ("$C_3$-$C_6$ cycloalkyl") carbon atoms. Illustrative examples of cycloalkyl groups include cyclopropyl, cyclobutyl, cyclopentyl, cyclohexyl, etc.

The term "$C_1$-$C_6$ alkoxyl" designates an alkyl group as defined above having between 1 and 6 carbon atoms, more preferably between 1 and 3 carbon atoms ("$C_1$-$C_3$ alkoxyl"), linked to the rest of the molecule through oxygen. Examples of alkoxy include methoxy, ethoxy, isopropoxy, tertbutoxy, and the like.

The term "$C_2$-$C_3$ alkylendioxy" designates a divalent group represent by —O—R—O—, where R is an alkylene group having two or three carbon atoms. These carbon atoms can be optionally substituted with one or more $C_1$-$C_6$ alkyl groups. Examples of $C_2$-$C_3$ alkylendioxy groups include —O—CH$_2$—CH$_2$—O—, —O—CH(CH$_3$)—CH(CH$_3$)—O—, —O—C(CH$_3$)$_2$—CH(CH$_3$)—O—, —O—C(CH$_3$)$_2$—C(CH$_3$)$_2$—O—, —O—CH$_2$—CH$_2$—CH$_2$—O—, —O—CH$_2$—C(CH$_3$)$_2$—CH$_2$—O— and —O—C(CH$_3$)$_2$—CH$_2$—C(CH$_3$)$_2$—O—.

The term "$C_6$-$C_{10}$ aryl" refers to an aromatic group having between 6 and 10, preferably 6 or 10 carbon atoms, comprising 1 or 2 aromatic nuclei fused to one another. Illustrative examples of aryl groups include phenyl, naphthyl, indenyl, phenanthryl, etc. Preferably, it is phenyl The term "halogen" refers to bromine, chlorine, iodine or fluorine.

The term "heterocyclyl" refers to a saturated or partially unsaturated monocyclic or bicyclic system containing from 3 to 10, preferably 5 to 7, ring atoms containing one or more, specifically one, two, three or four ring heteroatoms independently selected from N, O, and S, and the remaining ring atoms being carbon.

The term "heteroaryl" refers to an aromatic monocyclic or bicyclic system containing from 3 to 10, preferably 5 to 7, ring atoms containing one or more, specifically one, two, three or four ring heteroatoms independently selected from O, N and S, and the remaining ring atoms being carbon.

The term "hydroxyl protecting group" (HPG) refers to a group blocking the OH function for subsequent reactions that can be removed under controlled conditions. Hydroxyl protecting groups are well known in the art. Illustrative examples of hydroxyl protecting groups have been described by Green T W et al. in "Protective Groups in Organic Synthesis", 3rd Edition (1999), Ed. John Wiley & Sons. Virtually any hydroxyl protecting group can be used to put the invention into practice. Illustrative, non-limiting examples of HPGs include:

silyl ethers [—Si(R)(R')(R")]. R, R' and R" can be independently selected from $C_1$-$C_6$ alkyl, $C_3$-$C_7$ cycloalkyl, $C_6$-$C_1$ aryl, $C_1$-$C_6$ alkoxy and halogen. Examples of silyl ethers include trimethylsilyl ether, triethylsilyl ether, tert-butyldimethylsilyl ether, tert-butyldiphenylsilyl ether, tri-isopropylsilyl ether, diethylisopropylsilyl ether, hexyldimethylsilyl ether, triphenylsilyl ether, di-tert-butylmethylsilyl ether;

ethers [—R], including alkoxy and aryloxy methyl ethers [—CH$_2$—OR]. R can be selected from $C_1$-$C_6$ alkyl, $C_6$-$C_1$ aryl and ($C_6$-$C_{10}$)aryl($C_1$-$C_6$)alkyl. Examples of ethers include methyl ether, tert-butyl ether, benzyl ether, p-methoxybenzyl ether, 3,4-dimethoxybenzyl ether, trityl ether, allyl ether, methoxymethyl ether, 2-methoxyethoxymethyl ether, benzyloxymethyl ether, p-methoxybenzyloxymethyl ether, 2-(trimethylsilyl) ethoxymethyl ether; tetrahydropyranyl and related ethers;

esters [—COR]. R can be selected from $C_1$-$C_6$ alkyl, $C_6$-$C_{10}$ aryl and $(C_6$-$C_{10})$aryl$(C_1$-$C_6)$alkyl. Examples of esters include acetate ester, benzoate ester, pivalate ester, methoxyacetate ester, chloroacetate ester, levulinate ester; and carbonates [—COOR]. R can be selected from $C_1$-$C_6$ alkyl, $C_6$-$C_{10}$ aryl and $(C_6$-$C_{10})$aryl$(C_1$-$C_6)$alkyl. Examples of carbonates include benzyl carbonate, p-nitrobenzyl carbonate, tert-butyl carbonate, 2,2,2-trichloroethyl carbonate, 2-(trimethylsilyl)ethyl carbonate, allyl carbonate.

As understood in this technical area, there may be a certain degree of substitution in the aforementioned radicals. Therefore, there may be substitution in any of the groups of the present invention. The previous groups can be substituted in one or more available positions with one or more substituents. Said substituents include, for example and in non-limiting sense, $C_{1-6}$ alkyl, $C_{3-7}$ cycloalkyl, $C_6$-$C_{10}$ aryl, 3- to 10-membered heterocyclyl, 3- to 10-membered heteroaryl, halogen, —CN, $NO_2$, $CF_3$, —N($R_a$)($R_b$), —$OR_c$, —$SR_d$, —C(O)$R_e$, —C(O)O$R_f$, —C(O)N($R_g$)($R_h$), —OC(O)$R_i$; wherein $R_a$, $R_b$, $R_c$, $R_d$, $R_e$, $R_f$, $R_g$, $R_h$ and $R_i$ are independently selected from hydrogen, $C_1$-$C_6$ alkyl, $C_6$-$C_{10}$ aryl, 3- to 10-membered heterocyclyl, 3- to 10-membered heteroaryl and trifluoromethyl.

The invention also provides "salts" of the compounds described herein. By way of illustration, said salts can be acid addition salts, base addition salts or metal salts, and can be synthesized from the parent compounds containing a basic or acid moiety by means of conventional chemical processes known by the persons skilled in the art. Such salts are generally prepared, for example, by reacting the free acid or base forms of said compounds with a stoichiometric amount of the suitable base or acid in water or in an organic solvent or in a mixture of the two. Non-aqueous media such as ether, ethyl acetate, ethanol, acetone, isopropanol or acetonitrile are generally preferred. Illustrative examples of acid addition salts include inorganic acid addition salts such as, for example, hydrochloride, hydrobromide, hydroiodide, sulfate, nitrate, phosphate, etc., organic acid addition salts such as, for example, acetate, maleate, fumarate, citrate, oxalate, succinate, tartrate, malate, mandelate, methanesulfonate, p-toluenesulfonate, camphorsulfonate, etc. Illustrative examples of base addition salts include inorganic base salts such as, for example, ammonium salts and organic base salts such as, for example, ethylenediamine, ethanolamine, N,N-dialkylenethanolamine, triethanolamine, glutamine, amino acid basic salts, etc. Illustrative examples of metal salts include, for example, sodium, potassium, calcium, magnesium, aluminium and lithium salts.

The term "solvate" according to this invention is to be understood as meaning any form of the compound which has another molecule (most likely a polar solvent) attached to it via non-covalent bonding. Examples of solvate include hydrates and alcoholates, e.g. methanolates. Solvation methods are generally known in the state of the art.

The term "organic solvent" includes for example cyclic and acyclic ethers (e.g. $Et_2O$, $iPr_2O$, $tBu_2O$, MeOtBu, 1,4-dioxane, 1,3-dioxolane, 1,2-dimethoxyethane (DME), tetrahydrofuran (THF), methyltetrahydrofuran), hydrocarbon solvents (e.g. pentane, hexane, heptane), halogenated solvents (e.g. dichloromethane, chloroform), aromatic solvents (e.g. toluene, xylene), esters (e.g. EtOAc, BuOAc), nitriles (e.g. acetonitrile), amides (e.g. DMF, DMA, NMP), alcohols (e.g. methanol, ethanol, propanol, i-propanol, t-butanol), sulfoxides (DMSO) and mixtures thereof.

In an aspect, the invention is directed to a process for preparing Voxelotor, or a salt or solvate thereof, which comprises:

(a) reacting a compound of formula (I) or (I')

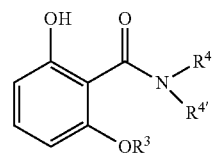
(I)

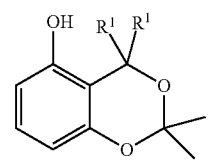
(I')

or a salt or solvate thereof, wherein
$R^3$ represents hydrogen or a hydroxyl protecting group,
$R^4$ and $R^{4'}$ are independently selected from $C_{1-6}$ alkyl and $C_{1-6}$ alkoxyl, and
each $R^1$ is hydrogen or they form, together with the carbon atom to which they
are attached, an oxo group;
with a compound of formula (II) or (III)

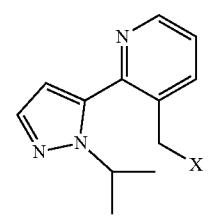
(II)

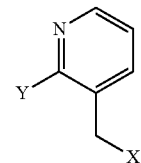
(III)

or a salt or solvate thereof, wherein
X is selected from OH, Cl, Br, I, OTf, OTs and OMs, and
Y is selected from Cl, Br, I, OTf and OMs;
to obtain a compound of formula (IV)/(IV') or (V)/(V') respectively

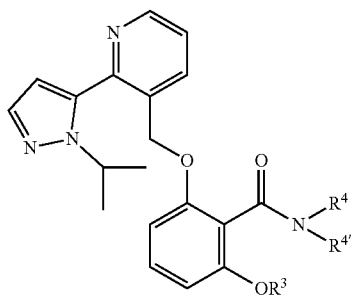

(IV)

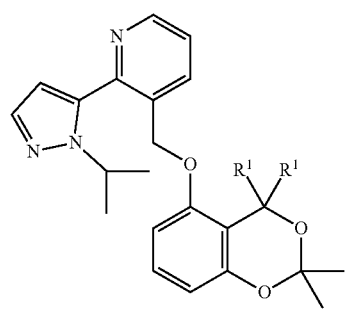

(IV')

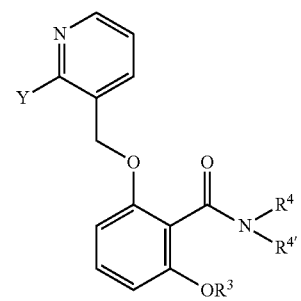

(V)

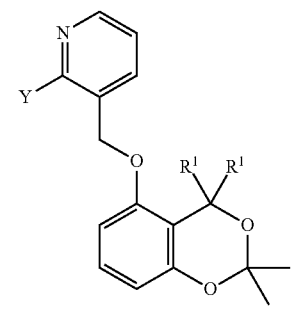

(V')

or a salt or solvate thereof; and
(b) converting the compound of formula (IV)/(IV') or (V)/(V'), or a salt or solvate thereof, into Voxelotor or a salt or solvate thereof.

In an embodiment, the process of the invention is carried out using a compound of formula (I), or a salt or solvate thereof.

In an embodiment, $R^3$ is a hydroxyl protecting group, such as an ether, a silyl ether, an ester or a carbonate.

In another embodiment, $R^4$ is a $C_{1-6}$ alkyl and $R^{4'}$ is a $C_{1-6}$ alkoxyl. In a particular embodiment, $R^4$ is methyl and $R^{4'}$ is methoxy.

In a further embodiment, $R^4$ is methyl and $R^{4'}$ is methoxy and $R^3$ is a hydroxyl protecting group.

In an embodiment, the compound of formula (I') is a compound of formula (I'A), or a salt or solvate thereof

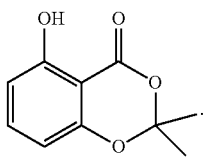

(I'A)

In another embodiment, the compound of formula (I') is a compound of formula (I'B), or a salt or solvate thereof

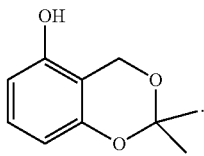

(I'B)

In an embodiment, X is selected from Cl and OH.
In another embodiment, Y is Cl.
In a preferred embodiment, Y is Cl and X is selected from Cl and OH; or Y is Cl and X is Cl.

Route A

In a particular embodiment, the process for preparing Voxelotor, or a salt or solvate thereof, comprises:
 (a) reacting a compound of formula (I) or (I'), or a salt or solvate thereof, with a compound of formula (II), or a salt or solvate thereof, to obtain a compound of formula (IV) or (IV'), or a salt or solvate thereof; and
 (b) converting the compound of formula (IV) or (IV'), or a salt or solvate thereof, into Voxelotor or a salt or solvate thereof.

Route A with a Compound of Formula (I)

In an embodiment of the invention, the process for preparing Voxelotor, or a salt or solvate thereof, comprises:
 (a) reacting a compound of formula (I), or a salt or solvate thereof, with a compound of formula (II), or a salt or solvate thereof, to obtain a compound of formula (IV), or a salt or solvate thereof; and
 (b) converting the compound of formula (IV), or a salt or solvate thereof, into Voxelotor or a salt or solvate thereof.

In an embodiment, the step of converting the compound of formula (IV), or a salt or solvate thereof, into Voxelotor or a salt or solvate thereof comprises:
 reducing the amide group in the compound of formula (IV), or a salt or solvate thereof, to the aldehyde; and
 if needed (i.e. only if $R^3$ is a hydroxyl protecting group), cleaving the hydroxyl protecting group either before or after the step of reduction of the amide.

In another embodiment, the step of converting the compound of formula (IV), or a salt or solvate thereof, into Voxelotor or a salt or solvate thereof comprises:
 if needed (i.e. only if $R^3$ is a hydroxyl protecting group), cleaving the hydroxyl protecting group in the compound of formula (IV), or a salt or solvate thereof;
 reducing the amide group in the compound of formula (IV) wherein $R^3$ is hydrogen, or a salt or solvate thereof, to the primary alcohol;
 oxidizing the primary alcohol group to obtain Voxelotor, or a salt or solvate thereof.

In a preferred embodiment, the process for preparing Voxelotor, or a salt or solvate thereof, comprises:

(a) reacting a compound of formula (I) wherein R³ is a hydroxyl protecting group, or a salt or solvate thereof, with a compound of formula (II), or a salt or solvate thereof, to obtain a compound of formula (IV) wherein R³ is a hydroxyl protecting group, or a salt or solvate thereof;

(b1) cleaving the hydroxyl protecting group to obtain a compound of formula (IV) wherein R³ is hydrogen, or a salt or solvate thereof; and (b2) reducing the amide group in the compound of formula (IV) wherein R³ is hydrogen, or a salt or solvate thereof, to obtain Voxelotor or a salt or solvate thereof.

In another embodiment, the process for preparing Voxelotor, or a salt or solvate thereof, comprises:

(a) reacting a compound of formula (I) wherein R³ is a hydroxyl protecting group, or a salt or solvate thereof, with a compound of formula (II), or a salt or solvate thereof, to obtain a compound of formula (IV) wherein R³ is a hydroxyl protecting group, or a salt or solvate thereof;

(b1) reducing the amide group in the compound of formula (IV) wherein R³ is a hydroxyl protecting group, or a salt or solvate thereof, to the corresponding aldehyde; and (b2) cleaving the hydroxyl protecting group to obtain Voxelotor or a salt or solvate thereof.

In a further embodiment, the process for preparing Voxelotor, or a salt or solvate thereof, comprises:

(a) reacting a compound of formula (I) wherein R³ is a hydroxyl protecting group, or a salt or solvate thereof, with a compound of formula (II), or a salt or solvate thereof, to obtain a compound of formula (IV) wherein R³ is a hydroxyl protecting group, or a salt or solvate thereof;

(b1) cleaving the hydroxyl protecting group;

(b2) reducing the amide group in the compound of formula (IV) wherein R³ is hydrogen, or a salt or solvate thereof, to the corresponding primary alcohol; and (b3) oxidizing the primary hydroxyl group to obtain Voxelotor or a salt or solvate thereof.

In a further embodiment, the process for preparing Voxelotor, or a salt or solvate thereof, comprises:

(a) reacting a compound of formula (I) wherein R³ is hydrogen, or a salt or solvate thereof, with a compound of formula (II), or a salt or solvate thereof, to obtain a compound of formula (IV) wherein R³ is hydrogen, or a salt or solvate thereof;

(b) reducing the amide group in the compound of formula (IV) wherein R³ is hydrogen, or a salt or solvate thereof, to obtain Voxelotor or a salt or solvate thereof.

Route A with a compound of formula (I')

In an embodiment of the invention, the process for preparing Voxelotor, or a salt or solvate thereof, comprises:

(a) reacting a compound of formula (I'), or a salt or solvate thereof, with a compound of formula (II), or a salt or solvate thereof, to obtain a compound of formula (IV'), or a salt or solvate thereof; and (b) converting the compound of formula (IV'), or a salt or solvate thereof, into Voxelotor or a salt or solvate thereof.

In an embodiment, the step of converting the compound of formula (IV'), or a salt or solvate thereof, into Voxelotor or a salt or solvate thereof comprises:

when R¹ groups in the compound of formula (IV') form, together with the carbon atom to which they are attached, an oxo group (i.e. when the compound of formula I' is a compound of formula I'A), either:

(b1) reduction of the compound of formula (IV'), or a salt or solvate thereof, to Voxelotor, or a salt or solvate thereof; or (b2) reduction of the compound of formula (IV'), or a salt or solvate thereof, to provide a compound of formula (VI)

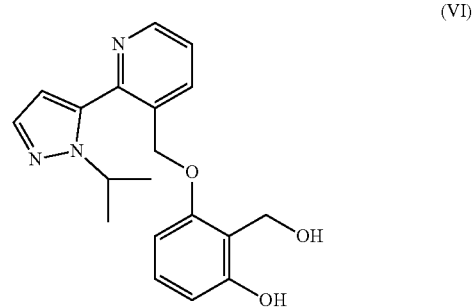 [SMILES: CC(C)n1nccc1-c1ncccc1COc1cccc(O)c1CO]

(VI)

or a salt or solvate thereof, and oxidation of the primary hydroxyl group to provide Voxelotor, or a salt or solvate thereof; or (b3) reaction of the compound of formula (IV'), or a salt or solvate thereof, with an amine of formula HNR⁴R⁴', or a salt or solvate thereof, wherein R⁴ and R⁴' are independently selected from $C_{1-6}$ alkyl and $C_{1-6}$ alkoxyl; to provide a compound of formula (IV) wherein R³ is hydrogen

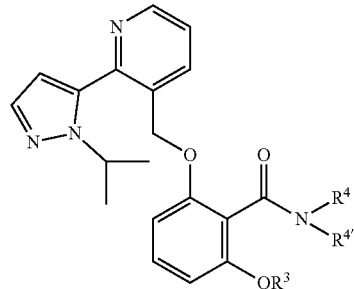

or a salt or solvate thereof, and reduction of the amide group to provide Voxelotor, or a salt or solvate thereof; or when each R¹ group in the compound of formula (IV') is hydrogen (i.e. when the compound of formula I' is a compound of formula I'B):

(b4) cleavage of the acetonide group of the compound of formula (IV'), or a salt or solvate thereof, to provide a compound of formula (VI), or a salt or solvate thereof, and oxidation of the primary hydroxyl group to provide Voxelotor, or a salt or solvate thereof.

In an embodiment of the invention, the process for preparing Voxelotor, or a salt or solvate thereof, comprises:

(a) reacting a compound of formula (I'A), or a salt or solvate thereof, with a compound of formula (II), or a salt or solvate thereof, to obtain a compound of formula (IV') wherein the R¹ groups form, together with the carbon atom to which they are attached, an oxo group, or a salt or solvate thereof; and (b) converting the compound of formula (IV') wherein the R¹ groups form, together with the carbon atom to which they are attached, an oxo group, or a salt or solvate thereof, into Voxelotor or a salt or solvate thereof.

In a preferred embodiment, the process for preparing Voxelotor, or a salt or solvate thereof, comprises:
(a) reacting a compound of formula (I'A), or a salt or solvate thereof, with a compound of formula (II), or a salt or solvate thereof, to obtain a compound of formula (IV') wherein the R¹ groups form, together with the carbon atom to which they are attached, an oxo group, or a salt or solvate thereof;
(b) reducing the compound of formula (IV') wherein the R¹ groups form, together with the carbon atom to which they are attached, an oxo group, or a salt or solvate thereof, to Voxelotor or a salt or solvate thereof.

In another preferred embodiment, the process for preparing Voxelotor, or a salt or solvate thereof, comprises:
(a) reacting a compound of formula (I'A), or a salt or solvate thereof, with a compound of formula (II), or a salt or solvate thereof, to obtain a compound of formula (IV') wherein the R¹ groups form, together with the carbon atom to which they are attached, an oxo group, or a salt or solvate thereof;
(b) reducing the compound of formula (IV') wherein the R¹ groups form, together with the carbon atom to which they are attached, an oxo group, or a salt or solvate thereof, to provide a compound of formula (VI), or a salt or solvate thereof; and
(c) oxidizing the primary hydroxyl group in the compound of formula (VI), or a salt or solvate thereof, to provide Voxelotor, or a salt or solvate thereof.

In another preferred embodiment, the process for preparing Voxelotor, or a salt or solvate thereof, comprises:
(a) reacting a compound of formula (I'A), or a salt or solvate thereof, with a compound of formula (II), or a salt or solvate thereof, to obtain a compound of formula (IV') wherein the R¹ groups form, together with the carbon atom to which they are attached, an oxo group, or a salt or solvate thereof;
(b) reacting the compound of formula (IV') wherein the R¹ groups form, together with the carbon atom to which they are attached, an oxo group, or a salt or solvate thereof, with a compound of formula HNR⁴R⁴', or a salt or solvate thereof, wherein R⁴ and R⁴' are independently selected from $C_{1-6}$ alkyl and $C_{1-6}$ alkoxyl; to provide a compound of formula (IV) wherein R³ is hydrogen, or a salt or solvate thereof; and
(c) reducing the amide group in the compound of formula (IV) wherein R³ is hydrogen, or a salt or solvate thereof, to provide Voxelotor, or a salt or solvate thereof.

In an embodiment of the invention, the process for preparing Voxelotor, or a salt or solvate thereof, comprises:
(a) reacting a compound of formula (I'B), or a salt or solvate thereof, with a compound of formula (II), or a salt or solvate thereof, to obtain a compound of formula (IV') wherein the R¹ groups are hydrogen, or a salt or solvate thereof; and
(b) converting the compound of formula (IV') wherein the R¹ groups are hydrogen, or a salt or solvate thereof, into Voxelotor or a salt or solvate thereof.

In a preferred embodiment, the process for preparing Voxelotor, or a salt or solvate thereof, comprises:
(a) reacting a compound of formula (I'B), or a salt or solvate thereof, with a compound of formula (II), or a salt or solvate thereof, to obtain a compound of formula (IV') wherein the R¹ groups are hydrogen, or a salt or solvate thereof;
(b) cleaving the acetonide group in the compound of formula (IV') wherein the R¹ groups are hydrogen, or a salt or solvate thereof, to provide a compound of formula (VI), or a salt or solvate thereof; and
(c) oxidizing the primary hydroxyl group in the compound of formula (VI), or a salt or solvate thereof, to provide Voxelotor, or a salt or solvate thereof.

Methods for preparing compounds of formula (II) are known in the art.

In a particular embodiment, the compound of formula (II) used in any of Routes A of the invention, or a salt or solvate thereof, is obtained by a process comprising reacting a compound of formula (III)

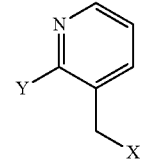

(III)

or a salt or solvate thereof, wherein
X is selected from OH, Cl, Br, I, OTf, OTs and OMs, and
Y is selected from Cl, Br, I, OTf and OMs;
with a compound of formula (VIII)

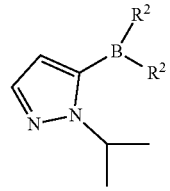

(VIII)

or a salt or solvate thereof, wherein each R² is independently selected from the group consisting of OH, $C_{1-6}$ alkyl, $C_{3-7}$ cycloalkyl, $C_{1-6}$ alkoxyl, or together they form a $C_{2-3}$ alkylenedioxy group optionally substituted by $C_{1-6}$ alkyl, or a benzyldioxy group optionally substituted by $C_{1-6}$ alkyl, or the $-B(R^2)_2$ group is $-BF_3K$.

In a preferred embodiment, the compound of formula (II) that is reacted with the compound of formula (I), or a salt o solvate thereof, is a compound of formula (II")

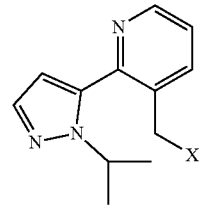

(II")

or a salt or solvate thereof, wherein X is selected from Cl, Br, I, OTf, OTs and OMs, more preferably Cl; which can be obtained by a process comprising reacting a compound of formula (III')

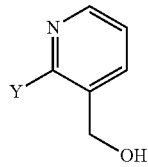

(III')

or a salt or solvate thereof, wherein Y is selected from Cl, Br, I, OTf and OMs; with a compound of formula (VIII), or a salt or solvate thereof, to obtain a compound of formula (II')

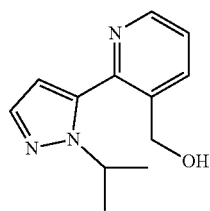

(II')

or a salt or solvate thereof; and converting a compound of formula (II'), or a salt or solvate thereof, into a compound of formula (II").

In a preferred embodiment of the invention, each $R^2$ in the compound of formula (VIII) is independently selected from the group consisting of OH, $C_{1-6}$ alkoxyl, or together they form a $C_{2-3}$ alkylenedioxy group optionally substituted by $C_{1-6}$ alkyl. More preferably, each $R^2$ is OH.

In a preferred embodiment, Y in the compound of formula (III) or (III') is Cl.

Route B

In another embodiment, the process for preparing Voxelotor, or a salt or solvate thereof, comprises:
(a) reacting a compound of formula (I) or (I'), or a salt or solvate thereof, with a compound of formula (III), or a salt or solvate thereof, to obtain a compound of formula (V) or (V')

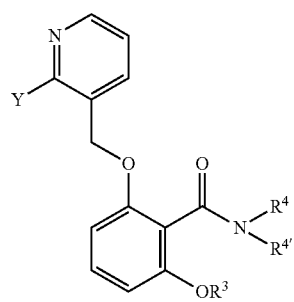

(V)

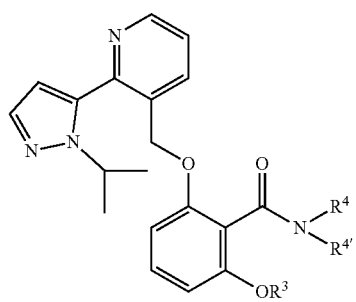

(V')

or a salt or solvate thereof, wherein
$R^3$ represents hydrogen or a hydroxyl protecting group,
$R^4$ and $R^{4'}$ are independently selected from $C_{1-6}$ alkyl and $C_{1-6}$ alkoxyl, and
each $R^1$ is hydrogen or they form, together with the carbon atom to which they are attached, an oxo group; and
(b) converting the compound of formula (V) or (V'), or a salt or solvate thereof, into Voxelotor or a salt or solvate thereof.

In a particular embodiment, the process for preparing Voxelotor, or a salt or solvate thereof, comprises:
(a) reacting a compound of formula (I) or (I'), or a salt or solvate thereof, with a compound of formula (III), or a salt or solvate thereof, to obtain a compound of formula (V) or (V'), or a salt or solvate thereof;
(b) reacting a compound of formula (V) or (V'), or a salt or solvate thereof, with a compound of formula (VIII)

(VIII)

or a salt or solvate thereof, wherein each $R^2$ is independently selected from the group consisting of OH, $C_{1-6}$ alkyl, $C_{3-7}$ cycloalkyl, $C_{1-6}$ alkoxyl, or together they form a $C_{2-3}$ alkylenedioxy group optionally substituted by $C_{1-6}$ alkyl, or a benzyldioxy group optionally substituted by $C_{1-6}$ alkyl, or the —$B(R^2)_2$ group is —$BF_3K$; to provide a compound of formula (IV) or (IV')

(IV)

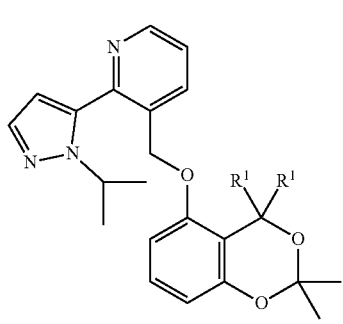
(IV')

or a salt or solvate thereof, wherein
$R^3$ represents hydrogen or a hydroxyl protecting group,
$R^4$ and $R^{4'}$ are independently selected from $C_{1-6}$ alkyl and $C_{1-6}$ alkoxyl, and
each $R^1$ is hydrogen or they form, together with the carbon atom to which they are attached, an oxo group; and
(c) converting the compound of formula (IV) or (IV'), or a salt or solvate thereof, into Voxelotor or a salt or solvate thereof.

In a preferred embodiment of the invention, each $R^2$ in the compound of formula (VIII) is independently selected from the group consisting of OH, $C_{1-6}$ alkoxyl, or together they form a $C_{2-3}$ alkylenedioxy group optionally substituted by $C_{1-6}$ alkyl. More preferably, each $R^2$ is OH.

In a preferred embodiment, Y in the compound of formula (V) or (V') is Cl.

This route of synthesis is advantageous since the expensive boron compound of formula (VIII) is used at a later stage of the synthesis and so can be used in a lower amount than in route A.

Route B with a Compound of Formula (I)

In an embodiment of the invention, the process for preparing Voxelotor, or a salt or solvate thereof, comprises:
(a) reacting a compound of formula (I), or a salt or solvate thereof, with a compound of formula (III), or a salt or solvate thereof, to obtain a compound of formula (V), or a salt or solvate thereof; and
(b) converting the compound of formula (V), or a salt or solvate thereof, into Voxelotor or a salt or solvate thereof.

Preferably, the process for preparing Voxelotor, or a salt or solvate thereof, comprises:
(a) reacting a compound of formula (I), or a salt or solvate thereof, with a compound of formula (III), or a salt or solvate thereof, to obtain a compound of formula (V), or a salt or solvate thereof;
(b) reacting a compound of formula (V), or a salt or solvate thereof, with a compound of formula (VIII), or a salt or solvate thereof, to provide a compound of formula (IV), or a salt or solvate thereof; and
(c) converting the compound of formula (IV), or a salt or solvate thereof, into Voxelotor or a salt or solvate thereof.

In an embodiment, the step of converting the compound of formula (IV), or a salt or solvate thereof, into Voxelotor or a salt or solvate thereof comprises:
reducing the amide group in the compound of formula (IV), or a salt or solvate thereof, to the aldehyde; and
if needed (i.e. only if $R^3$ is a hydroxyl protecting group), cleaving the hydroxyl protecting group either before or after the step of reduction of the amide.

In an embodiment of the invention, the process for preparing Voxelotor, or a salt or solvate thereof, comprises:
(a) reacting a compound of formula (I) wherein $R^3$ is a hydroxyl protecting group, or a salt or solvate thereof, with a compound of formula (III), or a salt or solvate thereof, to obtain a compound of formula (V) wherein $R^3$ is a hydroxyl protecting group, or a salt or solvate thereof;
(b) reacting a compound of formula (V) wherein $R^3$ is a hydroxyl protecting group, or a salt or solvate thereof, with a compound of formula (VIII), or a salt or solvate thereof, to provide a compound of formula (IV) wherein $R^3$ is a hydroxyl protecting group, or a salt or solvate thereof;
(c) reducing the amide group in the compound of formula (IV) wherein $R^3$ is a hydroxyl protecting group, or a salt or solvate thereof, to the aldehyde; and
(d) cleaving the hydroxyl protecting group to obtain Voxelotor or a salt or solvate thereof.

In another embodiment of the invention, the process for preparing Voxelotor, or a salt or solvate thereof, comprises:
(a) reacting a compound of formula (I) wherein $R^3$ is a hydroxyl protecting group, or a salt or solvate thereof, with a compound of formula (III), or a salt or solvate thereof, to obtain a compound of formula (V) wherein $R^3$ is a hydroxyl protecting group, or a salt or solvate thereof;
(b) reacting a compound of formula (V) wherein $R^3$ is a hydroxyl protecting group, or a salt or solvate thereof, with a compound of formula (VIII), or a salt or solvate thereof, to provide a compound of formula (IV) wherein $R^3$ is a hydroxyl protecting group, or a salt or solvate thereof;
(c) cleaving the hydroxyl protecting group to obtain a compound of formula (IV) wherein $R^3$ is hydrogen, or a salt or solvate thereof; and
(d) reducing the amide group in the compound of formula (IV) wherein $R^3$ is hydrogen, or a salt or solvate thereof, to obtain Voxelotor or a salt or solvate thereof.

In another embodiment of the invention, the process for preparing Voxelotor, or a salt or solvate thereof, comprises:
(a) reacting a compound of formula (I) wherein $R^3$ is a hydroxyl protecting group, or a salt or solvate thereof, with a compound of formula (III), or a salt or solvate thereof, to obtain a compound of formula (V) wherein $R^3$ is a hydroxyl protecting group, or a salt or solvate thereof;
(b) cleaving the hydroxyl protecting group to obtain a compound of formula (V) wherein $R^3$ is hydrogen, or a salt or solvate thereof;
(c) reacting a compound of formula (V) wherein $R^3$ is hydrogen, or a salt or solvate thereof, with a compound of formula (VIII), or a salt or solvate thereof, to provide a compound of formula (IV) wherein $R^3$ is hydrogen, or a salt or solvate thereof; and
(d) reducing the amide group in the compound of formula (IV) wherein $R^3$ is hydrogen, or a salt or solvate thereof, to obtain Voxelotor or a salt or solvate thereof.

In a further embodiment of the invention, the process for preparing Voxelotor, or a salt or solvate thereof, comprises:
(a) reacting a compound of formula (I) wherein $R^3$ is hydrogen, or a salt or solvate thereof, with a compound of formula (III), or a salt or solvate thereof, to obtain a compound of formula (V) wherein $R^3$ is hydrogen, or a salt or solvate thereof;
(b) reacting a compound of formula (V) wherein $R^3$ is hydrogen, or a salt or solvate thereof, with a compound of formula (VIII), or a salt or solvate thereof, to provide a compound of formula (IV) wherein R³ is hydrogen, or a salt or solvate thereof; and (c) reducing the amide group in the compound of formula (IV) wherein R³ is hydrogen, or a salt or solvate thereof, to obtain Voxelotor or a salt or solvate thereof.

Route B with a Compound of Formula (I')

In an embodiment of the invention, the process for preparing Voxelotor, or a salt or solvate thereof, comprises:

(a) reacting a compound of formula (I'), or a salt or solvate thereof, with a compound of formula (III), or a salt or solvate thereof, to obtain a compound of formula (V'), or a salt or solvate thereof; and (b) converting the compound of formula (V'), or a salt or solvate thereof, into Voxelotor or a salt or solvate thereof.

Preferably, the process for preparing Voxelotor, or a salt or solvate thereof, comprises:

(a) reacting a compound of formula (I'), or a salt or solvate thereof, with a compound of formula (III), or a salt or solvate thereof, to obtain a compound of formula (V'), or a salt or solvate thereof;

(b) reacting a compound of formula (V'), or a salt or solvate thereof, with a compound of formula (VIII), or a salt or solvate thereof, to provide a compound of formula (IV'), or a salt or solvate thereof; and (c) converting the compound of formula (IV'), or a salt or solvate thereof, into Voxelotor or a salt or solvate thereof.

In an embodiment, the step of converting the compound of formula (IV'), or a salt or solvate thereof, into Voxelotor or a salt or solvate thereof comprises:

when R¹ groups in the compound of formula (IV') form, together with the carbon atom to which they are attached, an oxo group (i.e. when the compound of formula I' is a compound of formula I'A), either:

(b1) reduction of the compound of formula (IV'), or a salt or solvate thereof, to Voxelotor, or a salt or solvate thereof; or (b2) reduction of the compound of formula (IV'), or a salt or solvate thereof, to provide a compound of formula (VI)

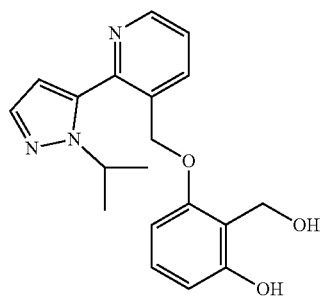

(VI)

or a salt or solvate thereof, and oxidation of the primary hydroxyl group to provide Voxelotor, or a salt or solvate thereof; or (b3) reaction of the compound of formula (IV'), or a salt or solvate thereof, with an amine of formula HNR⁴R⁴', or a salt or solvate thereof, wherein R⁴ and R⁴' are independently selected from $C_{1-6}$ alkyl and $C_{1-6}$ alkoxyl; to provide a compound of formula (IV) wherein R³ is hydrogen

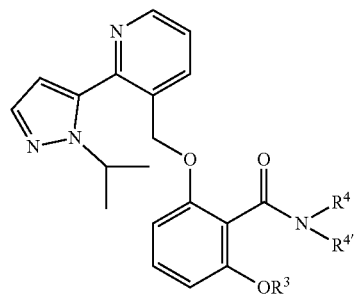

or a salt or solvate thereof, and reduction of the amide group to provide Voxelotor, or a salt or solvate thereof;

or when each R¹ group in the compound of formula (IV') is hydrogen (i.e. when the compound of formula I' is a compound of formula I'B):

(b4) cleavage of the acetonide group of the compound of formula (IV'), or a salt or solvate thereof, to provide a compound of formula (VI), or a salt or solvate thereof; and oxidation of the primary hydroxyl group to provide Voxelotor, or a salt or solvate thereof.

In an embodiment of the invention, the process for preparing Voxelotor, or a salt or solvate thereof, comprises:

(a) reacting a compound of formula (I'A), or a salt or solvate thereof, with a compound of formula (III), or a salt or solvate thereof, to obtain a compound of formula (V') wherein the R¹ groups form, together with the carbon atom to which they are attached, an oxo group, or a salt or solvate thereof;

(b) reacting a compound of formula (V') wherein the R¹ groups form, together with the carbon atom to which they are attached, an oxo group, or a salt or solvate thereof, with a compound of formula (VIII), or a salt or solvate thereof, to provide a compound of formula (IV') wherein the R¹ groups form, together with the carbon atom to which they are attached, an oxo group, or a salt or solvate thereof; and (c) converting the compound of formula (IV') wherein the R¹ groups form, together with the carbon atom to which they are attached, an oxo group, or a salt or solvate thereof, into Voxelotor or a salt or solvate thereof.

In a particular embodiment, the process for preparing Voxelotor, or a salt or solvate thereof, comprises:

(a) reacting a compound of formula (I'A), or a salt or solvate thereof, with a compound of formula (III), or a salt or solvate thereof, to obtain a compound of formula (V') wherein the R¹ groups form, together with the carbon atom to which they are attached, an oxo group, or a salt or solvate thereof;

(b) reacting a compound of formula (V') wherein the R¹ groups form, together with the carbon atom to which they are attached, an oxo group, or a salt or solvate thereof, with a compound of formula (VIII), or a salt or solvate thereof, to provide a compound of formula (IV') wherein the R¹ groups form, together with the carbon atom to which they are attached, an oxo group, or a salt or solvate thereof; and (c) reducing the compound of formula (IV') wherein the R¹ groups form, together with the carbon atom to which they are attached, an oxo group, or a salt or solvate thereof, to Voxelotor or a salt or solvate thereof.

In another embodiment, the process for preparing Voxelotor, or a salt or solvate thereof, comprises:
(a) reacting a compound of formula (I'A), or a salt or solvate thereof, with a compound of formula (III), or a salt or solvate thereof, to obtain a compound of formula (V') wherein the $R^1$ groups form, together with the carbon atom to which they are attached, an oxo group, or a salt or solvate thereof;
(b) reacting a compound of formula (V') wherein the $R^1$ groups form, together with the carbon atom to which they are attached, an oxo group, or a salt or solvate thereof, with a compound of formula (VIII), or a salt or solvate thereof, to provide a compound of formula (IV') wherein the $R^1$ groups form, together with the carbon atom to which they are attached, an oxo group, or a salt or solvate thereof;
(c) reducing the compound of formula (IV') wherein the $R^1$ groups form, together with the carbon atom to which they are attached, an oxo group, or a salt or solvate thereof, to provide a compound of formula (VI), or a salt or solvate thereof; and
(d) oxidizing the primary hydroxyl group in the compound of formula (VI), or a salt or solvate thereof, to provide Voxelotor, or a salt or solvate thereof.

In another embodiment, the process for preparing Voxelotor, or a salt or solvate thereof, comprises:
(a) reacting a compound of formula (I'A), or a salt or solvate thereof, with a compound of formula (III), or a salt or solvate thereof, to obtain a compound of formula (V') wherein the $R^1$ groups form, together with the carbon atom to which they are attached, an oxo group, or a salt or solvate thereof;
(b) reacting a compound of formula (V') wherein the $R^1$ groups form, together with the carbon atom to which they are attached, an oxo group, or a salt or solvate thereof, with a compound of formula (VIII), or a salt or solvate thereof, to provide a compound of formula (IV') wherein the $R^1$ groups form, together with the carbon atom to which they are attached, an oxo group, or a salt or solvate thereof; (c) reacting the compound of formula (IV') wherein the $R^1$ groups form, together with the carbon atom to which they are attached, an oxo group, or a salt or solvate thereof, with a compound of formula $HNR^4R^{4'}$, or a salt or solvate thereof, wherein $R^4$ and $R^{4'}$ are independently selected from $C_{1-6}$ alkyl and $C_{1-6}$ alkoxyl; to provide a compound of formula (IV) wherein $R^3$ is hydrogen, or a salt or solvate thereof; and
(d) reducing the amide group in the compound of formula (IV) wherein $R^3$ is hydrogen, or a salt or solvate thereof, to provide Voxelotor, or a salt or solvate thereof.

In an embodiment of the invention, the process for preparing Voxelotor, or a salt or solvate thereof, comprises:
(a) reacting a compound of formula (I'B), or a salt or solvate thereof, with a compound of formula (III), or a salt or solvate thereof, to obtain a compound of formula (V') wherein the $R^1$ groups are hydrogen, or a salt or solvate thereof; and
(b) reacting a compound of formula (V') wherein the $R^1$ groups are hydrogen, or a salt or solvate thereof, with a compound of formula (VIII), or a salt or solvate thereof, to provide a compound of formula (IV') wherein the $R^1$ groups are hydrogen, or a salt or solvate thereof; and (c) converting the compound of formula (IV') wherein the $R^1$ groups are hydrogen, or a salt or solvate thereof, into Voxelotor or a salt or solvate thereof.

In an embodiment, the process for preparing Voxelotor, or a salt or solvate thereof, comprises:
(a) reacting a compound of formula (IB), or a salt or solvate thereof, with a compound of formula (III), or a salt or solvate thereof, to obtain a compound of formula (V) wherein the $R^1$ groups are hydrogen, or a salt or solvate thereof;
(b) reacting a compound of formula (V) wherein the $R^1$ groups are hydrogen, or a salt or solvate thereof, with a compound of formula (VIII), or a salt or solvate thereof, to provide a compound of formula (IV) wherein the $R^1$ groups are hydrogen, or a salt or solvate thereof;
(c) cleaving the acetonide group in the compound of formula (IV) wherein the $R^1$ groups are hydrogen, or a salt or solvate thereof, to provide a compound of formula (VI), or a salt or solvate thereof; and
(d) oxidizing the primary hydroxyl group in the compound of formula (VI), or a salt or solvate thereof, to provide Voxelotor, or a salt or solvate thereof.

Particular and preferred embodiments for the above-mentioned reactions in the synthetic routes of the invention are as disclosed below.

Reaction of a Compound of Formula (I) or (I') with a Compound of Formula (II) or (III)

The compound of formula (IV)/(IV') or (V)/(V'), or a salt or solvate thereof, can be obtained by reacting a compound of formula (I)/(I'), or a salt or solvate thereof, with a compound of formula (II) or (III), respectively, or a salt or solvate thereof.

This reaction can be carried out under alkylation reaction conditions or under Mitsunobu reaction conditions. Preferably, it is carried out under alkylation reaction conditions.

(i) Alkylation Reaction

In a preferred embodiment, X in the compound of formula (II) or (III), or a salt or solvate thereof, is selected from Cl, Br, I, OTf, OTs and OMS and the reaction with the compound of formula (I) or (I'), or a salt or solvate thereof, is performed under alkylation reaction conditions.

Preferably, the reaction is carried out in the presence of a base and an organic solvent. Suitable bases include, for example, alkaline and alkaline earth metal carbonates, bicarbonates, phosphates, $C_{1-6}$ alkoxides, hydroxides and hydrides; preferably alkaline carbonates and hydrides, such as $Na_2CO_3$, $K_2CO_3$, $Cs_2CO_3$ or NaH. Suitable organic solvents include, for example, DMF, DMSO, NMP, acetonitrile, acetone, methylethyl ketone, THF, $CH_2Cl_2$, EtOAc, BuOAc.

In an embodiment, the reaction is carried out in the presence of an inorganic base, such as for alkaline and alkaline earth metal carbonates, bicarbonates, phosphates, $C_{1-6}$ alkoxides, hydroxides and hydrides; preferably alkaline carbonates and hydrides, such as $Na_2CO_3$, $K_2CO_3$, $Cs_2CO_3$ or NaH.

In an embodiment, the reaction is performed at a temperature between 0° C. and 150° C., preferably, between 3° and 120° C.

(ii) Mitsunobu Reaction

In another embodiment, X in the compound of formula (II) or (III), or a salt or solvate thereof, is OH and the reaction with the compound of formula (I) or (I'), or a salt or solvate thereof, is performed under Mitsunobu reaction conditions.

In an embodiment, the reaction is performed in the presence of a first reagent selected from the group consisting of triphenylphosphine, tributylphosphine and trimethylphosphine, and a second reagent selected from the group consisting of group consisting of diisopropyl azodicarboxylate (DIAD), di-tert-butyl azodicarboxylate (DBAD), diethyl azodicarboxylate (DEAD), di-p-chlorobenzyl azodicarboxylate (DCAD), 1,1'-(azodicarbonyl)dipiperidine (ADDP), N,N,N',N'-tetraisopropylazodicarboxamide (TIPA), N,N,N',N'-tetramethylazodicarboxamide (TMAD) and 4,7-dimethyl-3,4,5,6,7,8-hexahydro-1,2,4,7-tetrazocin-3,8-dione (DHTD). Preferably, in the presence of triphenylphosphine and DIAD or DEAD.

Preferably, the reaction is performed in an organic solvent, such as THF or toluene. It can be carried out, for example, at a temperature between −30° C. and 70° C., preferably, between 0 and 50° C.

Reaction of a Compound of Formula (VIII) with a Compound of Formula (III), (V) or (V') —Suzuki Reaction The compound of formula (II), (IV) or (IV'), or a salt or solvate thereof, can be obtained by Suzuki cross-coupling reaction of a compound of formula (VIII), or a salt or solvate thereof, with a compound of formula (III), (V) or (V'), respectively, or a salt or solvate thereof.

Preferably, the reaction is carried out in the presence of a base and a palladium catalyst.

Suitable bases include, for example, alkaline and alkaline earth metal carbonates, bicarbonates, phosphates, acetates, alkoxides, hydroxides and halides; preferably alkaline carbonates, bicarbonates and phosphates, such as $Na_2CO_3$, $K_2CO_3$, $Cs_2CO_3$, $NaHCO_3$, $Na_3PO_4$ or $K_3PO_4$.

In a preferred embodiment, the base is an inorganic base, such as alkaline or alkaline earth metal carbonate, bicarbonate or phosphate; preferably alkaline carbonates, bicarbonates and phosphates, such as $Na_2CO_3$, $K_2CO_3$, $Cs_2CO_3$, $NaHCO_3$, $Na_3PO_4$ or $K_3PO_4$, which can be used in any of their forms, including grounded into powder form. More preferably the base is $NaHCO_3$ or $Na_2CO_3$, even more preferably the base is $NaHCO_3$.

The base is typically used in an amount ranging from 1.0 and 8.0 equivalents for each equivalent of compound of formula (III), (V) or (XI), preferably from 1.5 to 5.0 equivalents.

Suitable palladium catalysts include, Pd(0) catalysts and Pd(II) catalysts that are reduced in situ to Pd(0). In an embodiment, the palladium catalyst is selected from $Pd(PPh_3)_4$, $Pd_2(dba)_3$, $Pd(OAc)_2$, $Pd(P^tBu_3)_2$, $Pd(PCy_3)_2$, $Pd(PPh_3)_2Cl_2$, $Pd(P(o-tol)_3)_2Cl_2$, $Pd(PCy_3)_2Cl_2$, $Pd(P^tBu_2Ph)_2Cl_2$, $Pd(P^tBuCy_2)_2Cl_2$, $Pd(P^tBu_2{}^nBu)_2Cl_2$, $Pd(amphos)Cl_2$ (amphos=di-tert-butyl(4-dimethylaminophenyl)phosphine), $Pd(dppe)_2Cl_2$ (dppe=(1,2-bis(diphenylphophino)ethane), $Pd(dppp)_2Cl_2$ (dppp=(1,2-bis(diphenylphophino)propane), $Pd(dppb)_2Cl_2$ (dppb=(1,2-bis(diphenylphophino)butane), $Pd(dppf)Cl_2$ (dppf=1,1'-bis(diphenylphosphino)ferrocene), $Pd(dtbpf)Cl_2$ (dtbpf=1,1'-bis(di-tert-butylphosphino)ferrocene), $Pd(dcypp)Cl_2$ (dcypp=bis(dicyclohexylphosphino)propane), $[PdBr(P^tBu_3)]_2$, Pd/C with $PPh_3$, $Pd(PhCN)_2Cl_2$, $Pd(CH_3CN)_2Cl_2$, and solvates thereof.

In a preferred embodiment, the palladium catalyst is selected from $Pd(PPh_3)_2Cl_2$, $Pd(amphos)Cl_2$, $Pd(PCy_3)_2Cl_2$ and $Pd(PCy_3)_2$. More preferably, it is selected from $Pd(PPh_3)_2Cl_2$ and $Pd(amphos)Cl_2$. Even more preferably, it is $Pd(amphos)Cl_2$.

Typically, the amount of the Pd catalyst is from 0.01% mol to 20% mol, such as from 0.1% mol to 10% mol.

The inventors have found that the Suzuki reaction can be carried out using very low amounts of the Pd catalyst, especially for preferred Pd catalysts defined above. In an embodiment, the Pd catalyst is used in an amount between 0.01 to 15 wt % based on the weight of the compound of formula (III), (V) or (V'). In an embodiment, it is used in an amount from 0.1 to 10 wt %, or from 0.1 to 5 wt %, based on the weight of the compound of formula (III), (V) or (V').

Further, in a particular embodiment the reaction proceeds in the presence of water, an organic solvent, or mixtures thereof.

According to a particular embodiment, this reaction is carried out in the presence of an organic solvent, for example, an ether (e.g., THF, 2-methyltetrahydrofuran, DME, dioxane, 1,3-dioxolane), a nitrile (e.g. acetonitrile), an alcohol (e.g. methanol, ethanol, propanol, i-propanol, t-butanol), an aromatic solvent (e.g., toluene, xylene) or mixtures thereof and, optionally, in the presence of water.

In a preferred embodiment, the reaction is carried out in the presence of water and an ether (e.g., THF, 2-methyltetrahydrofuran, DME, dioxane, 1,3-dioxolane), a nitrile (e.g. acetonitrile) or an alcohol (e.g. methanol, ethanol, propanol, i-propanol, t-butanol).

More preferably, in the presence of water and dioxane or in the presence of water and acetonitrile or in the presence of water and i-propanol. In an embodiment, the ratio of organic solvent to water ranges from 20:1 to 1:5, preferably from 10:1 to 1:1.

In a particular embodiment, the reaction is carried out using $NaHCO_3$ or $Na_2CO_3$ as the base, preferably $NaHCO_3$, and in the presence of an organic solvent and water.

In a particular embodiment, the reaction is carried out using $NaHCO_3$ or $Na_2CO_3$ as the base, preferably $NaHCO_3$, and in the presence of water and an ether (e.g., THF, 2-methyltetrahydrofuran, DME, dioxane, 1,3-dioxolane), a nitrile (e.g. acetonitrile) or an alcohol (e.g. methanol, ethanol, propanol, i-propanol, t-butanol).

In a particular embodiment, the reaction is carried out using $NaHCO_3$ or $Na_2CO_3$ as the base, preferably $NaHCO_3$, a Pd catalyst selected from $Pd(PPh_3)_2Cl_2$, $Pd(amphos)Cl_2$, $Pd(PCy_3)_2Cl_2$ and $Pd(PCy_3)_2$, and in the presence of an organic solvent and water.

In a particular embodiment, the reaction is carried out using $NaHCO_3$ or $Na_2CO_3$ as the base, preferably $NaHCO_3$, a Pd catalyst selected from $Pd(PPh_3)_2Cl_2$, $Pd(amphos)Cl_2$, $Pd(PCy_3)_2Cl_2$ and $Pd(PCy_3)_2$, and in the presence of water and an ether (e.g., THF, 2-methyltetrahydrofuran, DME, dioxane, 1,3-dioxolane), a nitrile (e.g. acetonitrile) or an alcohol (e.g. methanol, ethanol, propanol, i-propanol, t-butanol).

In a preferred embodiment, the reaction is carried out using $NaHCO_3$ or $Na_2CO_3$ as the base, preferably $NaHCO_3$, a Pd catalyst selected from $Pd(PPh_3)_2Cl_2$, $Pd(amphos)Cl_2$, $Pd(PCy_3)_2Cl_2$ and $Pd(PCy_3)_2$, and in the presence of water and an ether (e.g., THF, 2-methyltetrahydrofuran, DME, dioxane, 1,3-dioxolane), preferably waterand dioxane.

In a further embodiment, the reaction is carried out in the presence of $NaHCO_3$, $Pd(PPh_3)_2Cl_2$ and a mixture of water and dioxane.

In a further embodiment, the reaction is carried out in the presence of $NaHCO_3$, $Pd(PPh_3)_2Cl_2$ and a mixture of water and acetonitrile.

In a further embodiment, the reaction is carried out in the presence of $NaHCO_3$, $Pd(amphos)Cl_2$ and a mixture of water and THF.

In a further embodiment, the reaction is carried out in the presence of NaHCO$_3$, Pd(amphos)Cl$_2$ and a mixture of water and dioxane.

In a further embodiment, the reaction is carried out in the presence of Na$_2$CO$_3$, Pd(PCy$_3$)$_2$ and a mixture of water and i-propanol.

In an embodiment, the reaction is carried out in the presence of NaHCO$_3$, Pd(PPh$_3$)$_2$Cl$_2$, water and an ether, preferably dioxane.

The reaction can be carried out under heating, for example at a temperature comprised between 40° C. and 130° C., preferably between 60° C. and 110° C.

The compound of formula (VIII) is typically used in an amount ranging from 1.0 and 3.0 equivalents for each equivalent of compound of formula (III), (V) or (V'), preferably from 1.0 to 2.0 equivalents.

In a particular embodiment, each R$^2$ in the compound of formula (VIII) is independently selected from the group consisting of OH, C$_{1-6}$ alkoxyl, or together they form a C$_{2-3}$ alkylenedioxy group optionally substituted by C$_{1-6}$ alkyl. Preferably, each R$^2$ in the compound of formula (VIII) is OH, methoxy, ethoxy, i-propoxy or, together, form an ethylenedioxy, tetramethylethylenedioxy, propylendioxy, dimethylpropylendioxy, trimethylpropylendioxy or tetramethylpropylendioxy group. In an embodiment, each R$^2$ is OH.

In a preferred embodiment, the R$^2$ groups in the compound of formula (VIII) form together a C$_{2-3}$ alkylenedioxy group optionally substituted by C$_{1-6}$ alkyl, such as an ethylenedioxy, tetramethylethylenedioxy, propylendioxy, dimethylpropylendioxy, trimethylpropylendioxy or tetramethylpropylendioxy group. Preferably, they form a tetramethylethylenedioxy group.

In a preferred embodiment, the Pd catalyst is Pd(amphos)Cl$_2$ and the R$^2$ groups in the compound of formula (VIII) form together a C$_{2-3}$ alkylenedioxy group, preferably a tetramethylethylenedioxy group.

In a further preferred embodiment, the reaction is carried out in the presence of NaHCO$_3$, Pd(amphos)Cl$_2$, a mixture of water and an ether (preferably THF or dioxane) and a compound of formula (VIII) wherein the R$^2$ groups form together a C$_{2-3}$ alkylenedioxy group, preferably a tetramethylethylenedioxy group.

In a preferred embodiment, Y in the compound of formula (III), (V) or (V') is Cl.

Conversion of a Compound of Formula (IV) into Voxelotor

Voxelotor, or a salt or solvate thereof, can be obtained from a compound of formula (IV), or a salt or solvate thereof, by:
  reducing the amide group in the compound of formula (IV), or a salt or solvate thereof, to the aldehyde; and
  if needed (i.e. only if R$^3$ is a hydroxyl protecting group), cleaving the hydroxyl protecting group either before or after the step of reduction of the amide.

In a preferred embodiment, cleavage of the hydroxyl protecting group is carried out before reduction of the amide group.

(i) Reduction of the Amide Group in the Compound of Formula (IV) to Aldehyde or Alcohol In a preferred embodiment, the amide group is reduced to the aldehyde to provide a more straightforward synthesis of Voxelotor.

In an embodiment, reduction of the amide group in the compound of formula (IV), or a salt or solvate thereof, to the aldehyde is performed in the presence of a reducing agent and an organic solvent.

Preferably, the reduction reaction is performed in the presence of a reducing agent such as an aluminum hydride, for example DIBAL, LiAlH$_4$, LiAl(OtBu)$_3$H and Red-Al. More preferably, the reducing agent is DIBAL or LiAlH$_4$. Typically, the reducing agent can be used in an amount from 1.0 to 5.0 equivalents, preferably from 1.0 to 3.0.

The reduction reaction can be performed in the presence of an organic solvent, such as an ether (e.g. Et$_2$O, iPr$_2$O, tBu$_2$O, MeOtBu, 1,4-dioxane, 1,3-dioxolane, DME, THF, methyltetrahydrofuran), a hydrocarbon solvent (e.g. pentane, hexane, heptane), an aromatic solvent (e.g. toluene, xylene), an alcohol (e.g. methanol, ethanol, propanol, i-propanol, t-butanol), halogenated solvents (e.g. dichloromethane, chloroform), or mixtures thereof.

In an embodiment, the reduction reaction is carried out at a temperature between −78° C. and 30° C. Preferably, at a temperature between −78° C. and 0° C. Even more preferably, between −78° C. and −20° C.

In a preferred embodiment, R$^4$ is Me and R$^{4'}$ is OMe in the compound of formula (IV), and the reduction reaction is performed in the presence of DIBAL or LiAlH$_4$.

In a further preferred embodiment, R$^4$ is Me, R$^{4'}$ is OMe and R$^4$ is hydrogen in the compound of formula (IV), and the reduction reaction is performed in the presence of DIBAL or LiAlH$_4$.

(ii) Reduction of the Amide Group in the Compound of Formula (IV) to Alcohol

In an embodiment, reduction of the amide group in the compound of formula (IV), or a salt or solvate thereof, to the primary alcohol is performed in the presence of an excess of reducing agent and an organic solvent.

Preferably, the reduction reaction is performed in the presence of a reducing agent such as an aluminum hydride, for example DIBAL, LiAlH$_4$, LiAl(OtBu)$_3$H and Red-Al. More preferably, the reducing agent is DIBAL or LiAlH$_4$. Typically, the reducing agent can be used in an amount from 3.0 to 10.0 equivalents, preferably from 4.0 to 10.0.

The reduction reaction can be performed in the presence of an organic solvent, such as an ether (e.g. Et$_2$O, iPr$_2$O, tBu$_2$O, MeOtBu, 1,4-dioxane, 1,3-dioxolane, DME, THF, methyltetrahydrofuran), a hydrocarbon solvent (e.g. pentane, hexane, heptane), an aromatic solvent (e.g. toluene, xylene), an alcohol (e.g. methanol, ethanol, propanol, i-propanol, t-butanol), halogenated solvents (e.g. dichloromethane, chloroform), or mixtures thereof.

In an embodiment, the reduction reaction is carried out at a temperature between −78° C. and 50° C. Preferably, at a temperature between −78° C. and 25° C. Even more preferably, between −20° C. and 25° C.

In a preferred embodiment, R$^4$ is Me and R$^{4'}$ is OMe in the compound of formula (IV), and the reduction reaction is performed in the presence of DIBAL or LiAlH$_4$.

In a further preferred embodiment, R$^4$ is Me, R$^{4'}$ is OMe and R$^4$ is hydrogen in the compound of formula (IV), and the reduction reaction is performed in the presence of DIBAL or LiAlH$_4$.

(iii) Oxidation of the Primary Hydroxyl Group to Aldehyde

In an embodiment, oxidation of the primary hydroxyl group to the corresponding aldehyde is performed in the presence of an oxidizing agent and an organic solvent.

Suitable oxidizing agents include MnO$_2$, CrO$_3$, RuO$_4$, pyridinium chlorochromate, pyridinium dichromate, Dess-Martin periodinane, o-iodoxybenzoic acid, tetra-n-propylammonium perruthenate, CrO$_3$·2py (Collins reagent), DMSO—(COCl)$_2$ (Swern reagent), oxone, TEMPO, and the like.

The reaction can be carried out in the presence of water, an organic solvent, or mixtures thereof and is preferably carried out at a temperature between 0° C. and 125° C., preferably between 0° C. and 80° C.

(iv) Cleavage of the Hydroxyl Protective Group

Deprotection of the hydroxyl groups in the compounds of the invention can be performed by conventional methods known by those skilled in the art (e.g. Green T W et al. in "Protective Groups in Organic Synthesis", 3rd Edition (1999), Ed. John Wiley & Sons (ISBN 0-471-16019-9)).

For example, compounds wherein $OR^3$ represents an ester ($R^3$=COR) or a carbonate ($R^3$=COOR) can be easily deprotected by hydrolysis in basic or acid media according to well-established procedures of the state of the art.

Compounds wherein $OR^3$ represents a silyl ether ($R^3$=Si(R)(R')(R'')) can be deprotected by the use of fluoride reagents such as fluoride salts or HF, acid media, oxidizing media, etc.

Compounds wherein $OR^3$ represents an ether ($R^3$=R, $CH_2OR$) can be easily deprotected through hydrolysis in acid media (for example, for methyl ethers ($R^3$=$CH_2OR$)), hydrogenation (for example, for benzyl ethers), oxidation (for example, for aryl ethers), etc.

In a particular embodiment, $OR^3$ is a $C_{1-6}$ alkoxymethyl ether ($R^3$=$CH_2O(C_{1-6}$ alkyl)). Preferably, this hydroxyl protecting group is cleaved by acid hydrolysis, for example by treatment with an acid such as HCl, $H_2SO_4$, HBr, HF, $HNO_3$, acetic acid, trifluoroacetic acid, methanesulfonic acid, trifluoromethanesulfonic acid, p-toluenesulfonic acid. Conversion of a Compound of Formula (IV'), Wherein the $R^1$ Groups Form Together to the Carbon Atom to which they are Attached, an Oxo Group into Voxelotor Voxelotor, or a salt or solvate thereof, can be obtained from a compound of formula (IV') wherein the $R^1$ groups form together to the carbon atom to which they are attached, an oxo group, or a salt or solvate thereof, by:

(i) Reduction of the Compound of Formula (IV') to Voxelotor

In a particular embodiment, the dioxolanone group in the compound of formula (IV'), or a salt or solvate thereof, can be directly reduced to Voxelotor, or a salt or solvate thereof.

In an embodiment, the reaction is performed in the presence of a reducing agent and an organic solvent.

Preferably, this reaction is performed in the presence of a reducing agent such as an aluminum hydride, for example DIBAL, $LiAl(O^tBu)_3H$, $LiAl(O^tBu)(^iBu)_2H$, $KAl(O^tBu)(^iBu)_2H$ and $NaAl(O^tBu)(^iBu)_2H$.

Suitable organic solvents include, for example, ethers (e.g. $Et_2O$, $iPr_2O$, $tBu_2O$, MeOtBu, 1,4-dioxane, 1,3-dioxolane, DME, THF, methyltetrahydrofuran), hydrocarbon solvents (e.g. pentane, hexane, heptane), halogenated solvents (e.g. dichloromethane, chloroform), aromatic solvents (e.g. toluene, xylene), and mixtures thereof.

In an embodiment, the reaction is carried out at a temperature between −78° C. and 0° C. In a preferred embodiment, the reaction is performed in the presence of DIBAL at a temperature between −78° C. and −40° C.

Preferably, the reduction reaction is carried out using between 1 and 5, more preferably between 1 and 3, even more preferably between 1 and 1.5 equivalents, of the reducing agent per equivalent of compound of formula (IV), or a salt or solvate thereof.

(ii) Reduction of the Compound of Formula (IV') to an Alcohol of Formula (VI) Followed by Oxidation to Voxelotor In a particular embodiment, Voxelotor is obtained by reduction of the dioxolanone group in the compound of formula (IV'), or a salt or solvate thereof, to the alcohol of formula (VI), or a salt or solvate thereof, followed by oxidation of the primary hydroxyl group in the compound of formula (VI), or a salt or solvate thereof.

In an embodiment, reduction of the compound of formula (IV'), or a salt or solvate thereof, is performed in the presence of a reducing agent and an organic solvent.

Preferably, the reduction reaction is performed in the presence of a reducing agent such as an aluminum hydride, for example $LiAlH_4$, $LiBH_4$, $LiAlH_4$, $NaBH_4$, $LiAl(OtBu)_3H$ and Red-Al. More preferably, the reducing agent is $LiAlH_4$.

The reduction reaction can be performed in the presence of an organic solvent, such as an ether (e.g. $Et_2O$, $iPr_2O$, $tBu_2O$, MeOtBu, 1,4-dioxane, 1,3-dioxolane, DME, THF, methyltetrahydrofuran), a hydrocarbon solvent (e.g. pentane, hexane, heptane), an aromatic solvent (e.g. toluene, xylene), an alcohol (e.g. methanol, ethanol, propanol, i-propanol, t-butanol), halogenated solvents (e.g. dichloromethane, chloroform) or mixtures thereof.

In an embodiment, the reduction reaction is carried out at a temperature between −78° C. and 30° C. Preferably, at a temperature between −78° C. and 0° C.

In a particular embodiment, the reduction reaction is carried out using between 1 and 10, preferably between 1 and 5, more preferably between 1 and 3 equivalents of the reducing agent per equivalent of compound of formula (IV), or a salt or solvate thereof.

In an embodiment, oxidation of the compound of formula (VI), or a salt or solvate thereof, to Voxelotor, or a salt or solvate thereof is performed in the presence of an oxidizing agent and an organic solvent.

Suitable oxidizing agents include $MnO_2$, $CrO_3$, $RuO_4$, pyridinium chlorochromate, pyridinium dichromate, Dess-Martin periodinane, o-iodoxybenzoic acid, tetra-n-propylammonium perruthenate, $CrO_3 \cdot 2py$ (Collins reagent), DMSO—$(COCl)_2$ (Swern reagent), oxone, TEMPO, and the like.

The reaction can be carried out in the presence of water, an organic solvent, or mixtures thereof and is preferably carried out at a temperature between 0° C. and 125° C., preferably between 0° C. and 80° C.

(iii) Reaction of the Compound of Formula (IV') with an Amine $HNR^4R^{4'}$ to a compound of formula (IV) wherein $R^3$ is Hydrogen Followed by Reduction to Voxelotor In a particular embodiment, Voxelotor is obtained by reaction of the compound of formula (IV'), or a salt or solvate thereof, with a compound of formula $HNR^4R^{4'}$ to provide an amide of formula (IV) wherein $R^3$ is hydrogen, or a salt or solvate thereof, followed by reduction of the amide group in the compound of formula (IV) wherein $R^3$ is hydrogen, or a salt or solvate thereof.

In an embodiment, reaction of the compound of formula (IV'), or a salt or solvate thereof, with a compound of formula $HNR^4R^{4'}$, or a salt or solvate thereof, is performed in the presence of an organic solvent and preferably at a temperature between −30° C. and 150° C., more preferably between 0° C. and 70° C.

In a preferred embodiment, the compound of formula $HNR^4R^{4'}$ is HN(Me)OMe, or a salt or solvate thereof, and so the corresponding Weinreb amide is formed upon reaction with the compound of formula (IV'), or a salt or solvate thereof.

In an embodiment, reduction of the compound of formula (IV) wherein $R^3$ is hydrogen, or a salt or solvate thereof, to Voxelotor, or a salt or solvate thereof is performed in the presence of a reducing agent and an organic solvent.

Preferably, the reduction reaction is performed in the presence of a reducing agent such as an aluminum hydride, for example DIBAL, LiAlH$_4$, LiAl(OtBu)$_3$H and Red-Al. More preferably, the reducing agent is DIBAL or LiAlH$_4$.

The reduction reaction can be performed in the presence of an organic solvent, such as an ether (e.g. Et$_2$O, iPr$_2$O, tBu$_2$O, MeOtBu, 1,4-dioxane, 1,3-dioxolane, DME, THF, methyltetrahydrofuran), a hydrocarbon solvent (e.g. pentane, hexane, heptane), an aromatic solvent (e.g. toluene, xylene), an alcohol (e.g. methanol, ethanol, propanol, i-propanol, t-butanol), halogenated solvents (e.g. dichloromethane, chloroform), or mixtures thereof.

In an embodiment, the reduction reaction is carried out at a temperature between −78° C. and 30° C. Preferably, at a temperature between −78° C. and 0° C. More preferably, the reaction is carried out at a temperature between −78° C. and −20° C.; even more preferably between −78° C. and −40° C.

In a preferred embodiment, R$^4$ is Me and R$^{4'}$ is OMe in the compounds of formula HNR$^4$R$^{4'}$ and formula (IV), and the reduction reaction is performed in the presence of DIBAL or LiAlH$_4$.

Conversion of a Compound of Formula (IV'), Wherein the R$^1$ are Hydrogen into Voxelotor Voxelotor, or a salt or solvate thereof, can be obtained from a compound of formula (IV') wherein the R$^1$ groups are hydrogen, or a salt or solvate thereof, by cleavage of the acetonide group to provide a compound of formula (VI), or a salt or solvate thereof, followed by oxidation of the primary hydroxyl group.

The deprotection or cleavage of the acetonide group of the compound of formula (IV') can be carried out following methods known in the state of the art (e.g. Green T W et al., "Protective Groups in Organic Synthesis", 3rd Edition (1999), Ed. John Wiley & Sons). In a particular embodiment, the cleavage is carried by hydrolysis in acid media Acid hydrolysis conditions include, by way of a non-limiting illustration, the use of acids such as p-toluenesulfonic acid, camphor sulfonic acid, acetic acid, trifluroacetic acid, methanesulfonic acid, trifluoromethanesulfonic acid, formic acid, Cl, H$_2$SO$_4$, HBr, HF, HNO$_3$, etc. It can be carried out in the presence of water, an organic solvent, or mixtures thereof.

Hydrolysis reaction can be performed at a temperature comprised between −30° C. and 120° C., preferably between 0° C. and 60° C.

In an embodiment, oxidation of the compound of formula (VI), or a salt or solvate thereof, to Voxelotor, or a salt or solvate thereof is performed in the presence of an oxidizing agent and an organic solvent.

Suitable oxidizing agents include MnO$_2$, CrO$_3$, RuO$_4$, pyridinium chlorochromate, pyridinium dichromate, Dess-Martin periodinane, o-iodoxybenzoic acid, tetra-n-propylammonium perruthenate, CrO$_3$·2py (Collins reagent), DMSO—(COCl)$_2$ (Swern reagent), oxone, TEMPO, and the like.

The reaction can be carried out in the presence of water, an organic solvent, or mixtures thereof and is preferably carried out at a temperature between 0° C. and 125° C., preferably between 0° C. and 80° C.

Synthesis of Starting Compounds

Compounds of formula (I), (I'), (II), (III) and (VIII) can be obtained by well known methods in the prior art or as disclosed herein.

In a preferred embodiment, the compound of formula (I) or (I'), or a salt or solvate thereof, is obtained from 2,6-dihydroxybenzoic acid.

For example, compound (I'A) can be obtained from 2,6-dihydroxybenzoic acid, for instance, as disclosed in Organic Letters 2000, 2(23), 3731-3734, in Organic Process Research and Development 2016, 20(2), 233-241.

In an embodiment, compound (I'A), or a salt or solvate thereof, can be obtained by reaction of 2,6-dihydroxybenzoic acid

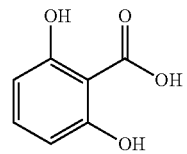 [SMILES: O=C(O)c1c(O)cccc1O]

or a salt or solvate thereof, with acetone.

Reaction with acetone is preferably carried out in the presence of an acid. Suitable acids include inorganic acid and organic acids, such as HCl, HBr, H$_2$SO$_4$, HNO$_3$, methyl sulphonic acid, trifluoromethyl sulphonic acid, benzyl sulphonic acid, p-toluene sulphonic acid.

In an embodiment, compound (I'B), or a salt or solvate thereof, is obtained by a process comprising:

reduction of compound (I'A), or a salt or solvate thereof, to compound (I'B), or a salt or solvate thereof.

In another embodiment, compound (I'B), or a salt or solvate thereof, is obtained by a process comprising:

reduction of compound (I'A), or a salt or solvate thereof, to compound

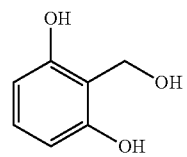

or a salt or solvate thereof, and reaction of 2-hydroxymethyl-benzene-1,3-diol, or a salt or solvate thereof, with acetone.

Preferably, the reduction of compound (I'A) is performed in the presence of a reducing agent such as an aluminum hydride, for example LiAlH$_4$, LiBH$_4$, LiAlH$_4$, NaBH$_4$, LiAl(OtBu)$_3$H and Red-Al. More preferably, the reducing agent is LiAlH$_4$. The reduction reaction can be performed in the presence of an organic solvent, such as an ether (e.g. Et$_2$O, iPr$_2$O, tBu$_2$O, MeOtBu, 1,4-dioxane, 1,3-dioxolane, DME, THF, methyltetrahydrofuran), a hydrocarbon solvent (e.g. pentane, hexane, heptane), an aromatic solvent (e.g. toluene, xylene), an alcohol (e.g. methanol, ethanol, propanol, i-propanol, t-butanol), halogenated solvents (e.g. dichloromethane, chloroform) or mixtures thereof. In an embodiment, the reduction reaction is carried out at a temperature between −78° C. and 30° C. Preferably, at a temperature between −78° C. and 0° C.

In a further embodiment, compound (I'B), or a salt or solvate thereof, is obtained by a process comprising:

reduction of 2,6-dihydroxybenzoic acid, or a salt or solvate thereof, to compound

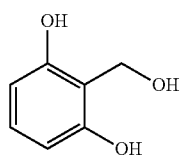

or a salt or solvate thereof, and
reaction of 2-hydroxymethyl-benzene-1,3-diol, or a salt or solvate thereof, with acetone.

Preferably, the reduction of 2,6-dihydroxybenzoic acid is performed in the presence of a reducing agent such as an aluminum hydride, for example $LiAlH_4$, $LiBH_4$, $LiAlH_4$, $NaBH_4$, $LiAl(OtBu)_3H$ and Red-Al. More preferably, the reducing agent is $LiAlH_4$. The reduction reaction can be performed in the presence of an organic solvent, such as an ether (e.g. $Et_2O$, $iPr_2O$, $tBu_2O$, MeOtBu, 1,4-dioxane, 1,3-dioxolane, DME, THF, methyltetrahydrofuran), a hydrocarbon solvent (e.g. pentane, hexane, heptane), an aromatic solvent (e.g. toluene, xylene), an alcohol (e.g. methanol, ethanol, propanol, i-propanol, t-butanol), halogenated solvents (e.g. dichloromethane, chloroform) or mixtures thereof. In an embodiment, the reduction reaction is carried out at a temperature between −78° C. and 30° C. Preferably, at a temperature between −78° C. and 0° C.

Suitable conditions for the reaction of 2-hydroxymethyl-benzene-1,3-diol, or a salt or solvate thereof, with acetone are as defined above for the synthesis of compound (I'A).

In an embodiment, compound (1), or a salt or solvate thereof, is obtained by a process comprising:
optionally, protection of the hydroxyl group in compound (I'A), or a salt or solvate thereof, to provide a compound of formula (I"A)

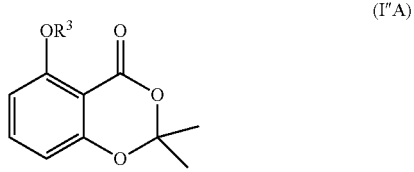

(I"A)

or a salt or solvate thereof, wherein $R^3$ is a hydroxyl protecting group;
reaction of a compound of formula (I'A) or (I"A), or a salt or solvate thereof, with a compound of formula $HNR^4R^{4'}$, wherein $R^4$ and $R^{4'}$ are independently selected from $C_{1-6}$ alkyl and $C_{1-6}$ alkoxyl.

In another embodiment, compound (1), or a salt or solvate thereof, is obtained by a process comprising:
optionally, protection of a hydroxyl group in 2,6-dihydroxybenzoic acid, or a salt or solvate thereof, to provide a compound of formula (IX)

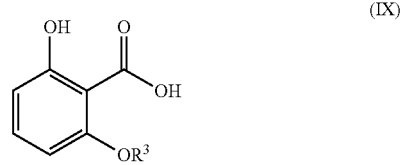

(IX)

or a salt or solvate thereof, wherein $R^3$ is a hydroxyl protecting group;

reaction of 2,6-dihydroxybenzoic acid or a compound of formula (IX), or a salt or solvate thereof, with a compound of formula $HNR^4R^{4'}$, wherein $R^4$ and $R^{4'}$ are independently selected from $C_{1-6}$ alkyl and $C_{1-6}$ alkoxyl.

Suitable and preferred embodiments for $R^3$, $R^4$ and $R^{4'}$ and for the conditions for the reaction of (I'A), (I"A), 2,6-dihydroxybenzoic acid and (IX) with a compound of formula $HNR^4R^{4'}$, are as defined above for the preparation of Voxelotor and, in particular, for the reaction of a compound of formula (IV') with an amine $HNR^4R^{4'}$.

If needed during the processes of the invention, protection and/or deprotection reactions of the hydroxyl groups can be performed at any stage of the synthesis. The most suitable stage for said protection and/or deprotection can be readily determined by those skilled in the art.

Protection and deprotection of the hydroxyl groups in the compounds of the invention can be performed by conventional methods known by those skilled in the art (e.g. Green T W et al. in "Protective Groups in Organic Synthesis", 3rd Edition (1999), Ed. John Wiley & Sons (ISBN 0-471-16019-9)).

For example, compounds wherein $OR^3$ represents an ester ($R^3$=COR) or a carbonate ($R^3$=COOR) can be easily protected by treatment of the hydroxyl group with a carboxylic acid, an acid halide or an anhydride and easily deprotected by hydrolysis in basic or acid media according to well-established procedures of the state of the art.

Compounds wherein $OR^3$ represents a silyl ether ($R^3$=Si(R)(R')(R")) can be easily protected by treatment of the hydroxyl group with a silylating agent (e.g. a silyl halide) and easily deprotected by the use of fluoride reagents such as fluoride salts or HF, acid media, oxidizing media, etc.

Compounds wherein $OR^3$ represents an ether ($R^3$=R, $CH_2OR$) can be easily protected by treatment of the hydroxyl group with an alkylating or arylating agent (e.g an alkyl halide) and easily deprotected through hydrolysis in acid media (for example, for methyl ethers ($CH_2OR$)), hydrogenation (for example, for benzyl ethers), oxidation (for example, for aryl ethers), etc.

In a particular embodiment, the process of the invention comprises converting 2,6-dihydroxybenzoic acid, or a salt or solvate thereof, into a compound of formula (I) or (I'), or a salt or solvate thereof, and then converting the compound of formula (I) or (I'), or a salt or solvate thereof, into Voxelotor, or a salt or solvate thereof, by any of the processes disclosed herein.

In another embodiment, the process of the invention comprises starting from a compound of formula (I'A), or a salt or solvate thereof, optionally converting it into a compound of formula (I) or (I'B), or a salt or solvate thereof, and then converting the compound of formula (I), (I'A) or (I'B), or a salt or solvate thereof, into Voxelotor, or a salt or solvate thereof, by any of the processes disclosed herein.

Compounds of Formula (I), (IV), (V), (VI) and (VII)

Compounds of formula (I), (I'), (IV), (IV'), (V), (V'), and (VI) are useful intermediates for the preparation of Voxelotor.

Therefore, in another aspect, the invention is directed to a compound selected from the group consisting of:

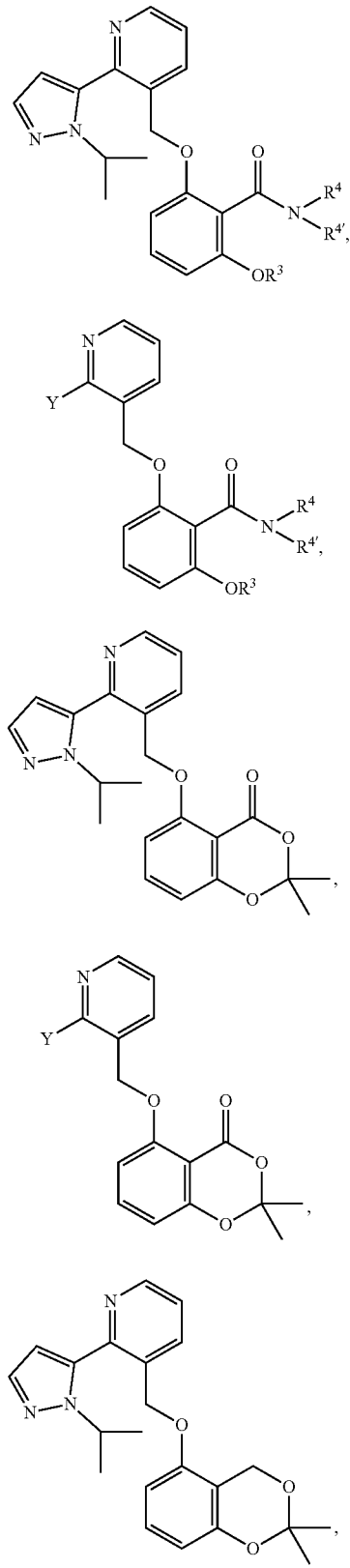

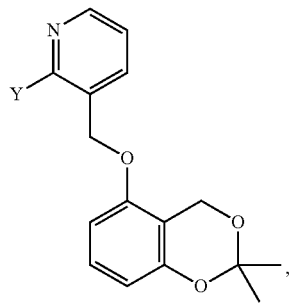

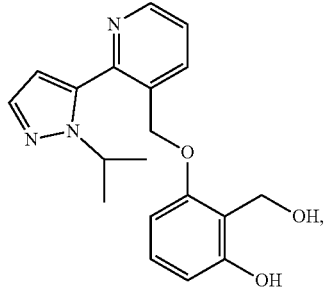

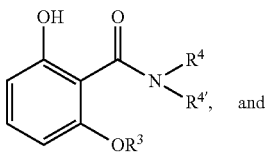

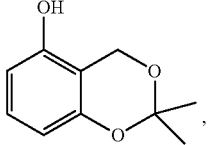

or a salt or solvate thereof, wherein

Y is selected from Cl, Br, I, OTf and OMs, $R^3$ represents hydrogen or a hydroxyl protecting group, and in the compound of formula (IV) and (V) $R^4$ and $R^{4'}$ are each independently selected from $C_{1-6}$ alkyl and $C_{1-6}$ alkoxyl, and in the compound of formula (I) $R^4$ is $C_{1-6}$ alkyl and $R^{4'}$ is $C_{1-6}$ alkoxyl;

with the proviso that the compound of formula (I) is not 2-hydroxy-N,6-dimethoxy-N-methyl-benzamide and 2,6-dihydroxy-N-methoxy-N-methyl-benzamide.

Preferred embodiments for the compounds of formula (I), (IV), (V) and (V'A) are, respectively, the following compounds:

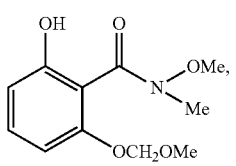

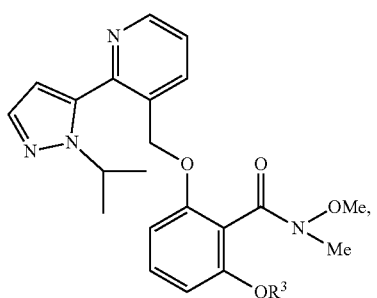
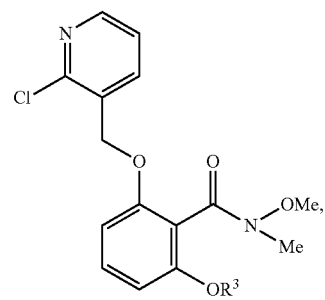
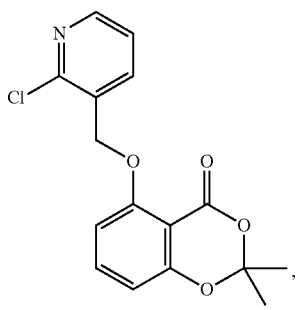
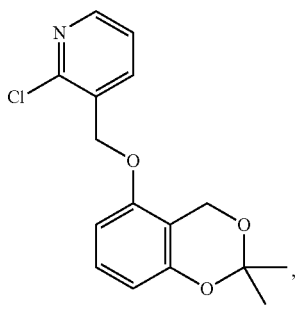

or a salt or solvate thereof, wherein R³ represents hydrogen or a hydroxyl protecting group.

In a preferred embodiment R³ is a group of formula R or CH₂—OR, wherein R is selected from C₁-C₆ alkyl, C₆-C₁₀ aryl and (C₆-C₁₀)aryl(C₁-C₅)alkyl. Examples of OR³ groups include methyl ether, tert-butyl ether, benzyl ether, p-methoxybenzyl ether, 3,4-dimethoxybenzyl ether, trityl ether, allyl ether, methoxymethyl ether, 2-methoxyethoxymethyl ether, benzyloxymethyl ether, p-methoxybenzyloxymethyl ether, 2-(trimethylsilyl)ethoxymethyl ether; tetrahydropyranyl and related ethers. In a particular embodiment, R³ is a methoxymethyl group (MOM).

EXAMPLES

Preparation of Compound (I) and (I'A)

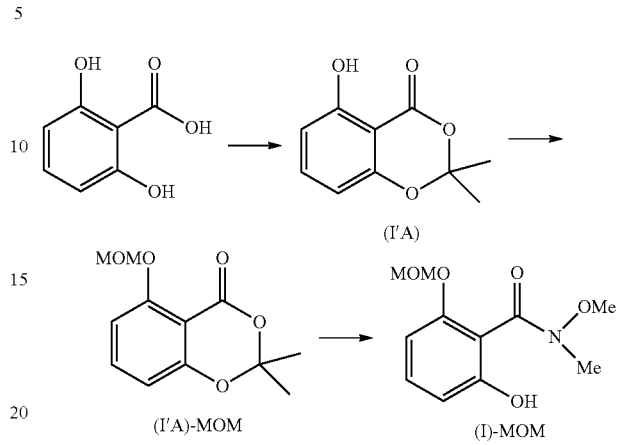

Preparation of (I'A)

Compound (I'A) can be obtained, for example, as disclosed in Synthetic Communications 1994, 24(7), 1025-1028.

A 0.5 L, 3-neck round bottom flask was charged with 2,6-dihydroxybenzoic acid (50 g, 0.32 mol), dimethoxyethane (108 mL), 4-dimethylaminopyridine (2.04 g, 10.017 mol) and acetone (30.8 mL). This solution was cooled to 20° C. and a solution of thionyl chloride (34 mL) dissolved in dimethoxyethane (15.4 mL) was added over 2 h, maintaining the temperature at less than 30° C. Upon completion of the addition, the resulting solution was stirred until the end of the reaction. At this point, the solution was added dropwise to a mixture of water/ice (200 mL/200 mL). The mixture was extracted with methylene chloride (100 mL). The combined organic phase was washed with a solution of sodium bicarbonate 7%. The organic phase was evaporated. The precipitate was filtered, washed with methylene chloride, dried under vacuo at 50° C. to give 5-hydroxy-2,2-dimethyl-benzo[1,3]dioxin-4-one (42.33 g). 1H-NMR (400 MHz, CDC13) 10.31 (s, 1H), 7.38 (t, 1H), 6.60 (dt, 1H), 6.41 (dt, 1H), 1.72 (s, 6H); 13C-NMR (100 MHz, CDC13) 165.5, 161.5, 155.6, 138.0, 110.8, 107.3, 107.2, 99.4, 25.7.

Preparation of (I'A)-MOM

A mixture of dimethoxymethane (34.5 ml), acetyl chloride (13.8 ml) and zinc bromide (0.083 g) was stirred at 20/25° C. for 2 h. The resulting mixture was added to a solution of compound (I'A) (18.9 g) in CH₂Cl₂ (190 ml) and DIPEA (41 ml) at 20/25° C. After completion of the reaction, water (60 ml) was added. The organic layer was separated and the aqueous layer was extracted with CH₂Cl₂ (20 ml). The combined organic layers were washed with water (2×60 ml), extracting each aqueous layer again with CH₂Cl₂ (20 ml). The organic layer was concentrated and the resulting residue purified by column chromatography (ethyl acetate/heptane 1:1) to provide 21.73 g of the product. 1H-NMR (400 MHz, CDCl₃) 7.37 (t, 1H), 6.81 (dd, 1H), 6.55 (dd, 1H), 5.26 (s, 2H), 3.47 (s, 3H), 1.65 (s, 6H). 13C-NMR (100 MHz, CDCl₃) 159.0, 158.0, 157.6, 136.3 (CH), 110.8, 110.3 (CH), 109.5 (CH), 107.1; 105.3; 104.3, 95.0 (CH2), 56.6 (CH3), 25.6 (CH3).

Preparation of (1)-MOM

Isopropylmagnesium chloride (200 ml) was added to a mixture of (I'A)-MOM (21.5 g), in THF (1264 ml) and N,O-dimethylhydroxylamine hydrochloride (13.1 g) at −20° C., so that the temperature did not exceed −20° C. After completion of the reaction, 10% acetic acid (215 ml) was added. The mixture was stirred at 20° C. and the layers were separated. The organic layer was concentrated giving rise to a two-layer residue. The upper layer was purified by column chromatography to provide 1.7 g of the product. The lower layer was stirred and the product crystallized, which was filtered and washed with heptane, leading to 5 g of the product. So, a total of 6.7 g of (I)-MOM were obtained. 1H-NMR (400 MHz, CDCl$_3$) 7.07 (t, 1H), 6.57 (dd, 1H), 6.53 (dd, 1H), 5.11 (s, 2H), 3.66 (s, 3H), 3.43 (s, 3H); 3.67 (s, 3H). 13C-NMR (100 MHz, CDCl$_3$) 155.6, 154.7, 131.3, 110.6, 106.0, 95.0, 61.3, 56.3, 34.2.

Preparation of Compound 4

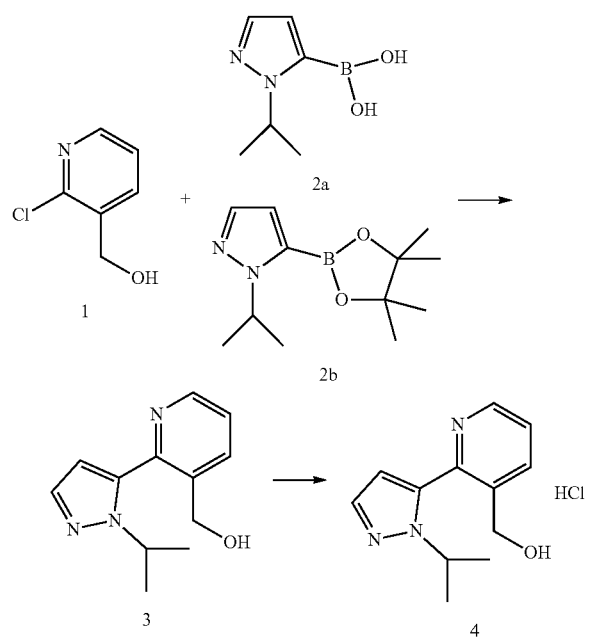

Preparation of Compound 1

ACS Med. Chem. Lett., 2017, 8 (3), 321-326.

To a solution of 2-chloronicotinic acid (50 g) and triethylamine (53 mL) in THF (1250 mL) was added i-butyl chloroformate (49.5 mL) at 0° C. The mixture was stirred at 0° C. until the end of the reaction. The precipitate was filtered and washed with THF. To this liquid filtrate, NaBH$_4$ (24 g) and water (12.5 mL) were added at 0° C. Then, water (37.5 mL) was added and the mixture stirred until the end of the reaction. The reaction mixture was filtered and the filtrate was concentrated to dryness. The crude solid was suspended in ethylacetate and heptane. The suspension was filtered and the filtrate was concentrated to dryness. The product (2-bromopyridin-3-yl)methanol 1 was used in the next step without further purification. 1H-NMR (400 MHz, CDCl$_3$) 8.20 (m, 1H), 7.90 (m, 1H), 7.24 (m, 1H), 4.74 (s, 2H), 3.82 (s, 1H); 13C-NMR (100 MHz, CDCl$_3$) 148.9, 147.8, 137.0, 135.6, 122.9, 61.1.

Preparation of Compound 3 from Boronic Acid 2a

To a 250 mL flask containing 1-isopropyl-1H-pyrazole-5-boronic acid 2a (10.7 g) and 90 mL of dioxane were added (2-chloropyridin-3-yl)methanol 1 (5.0 g), water (27.5 mL), trans-dichloro bis(triphenylphosphine)palladium(II) (0.77 g), and sodium bicarbonate (8.8 g). The mixture was heated under nitrogen at 82° C., and stirred until reaction was finished. The precipitate was filtered and washed with dioxane. The combined filtrates were concentrated to afford a light brown oil. The crude was purified on silica gel using ethyl acetate/heptane as eluent to give (2-(1-isopropyl-1 H-pyrazol-5-yl)pyridin-3-yl)methanol 3 (7.06 g, 93%). 1H-NMR (400 MHz, CDCl$_3$) 8.57 (d, 1H), 7.94 (d, 1H), 7.49 (d, 1H), 7.34 (dd, 1H), 6.27 (d, 1H), 4.53 (s, 2H), 4.45 (m, 1H), 1.38 (d, 6H). 13C-NMR (100 MHz, CDCl$_3$) 148.3, 138.6, 138.2, 136.6, 136.2, 123.7, 106.8, 61.2, 50.8, 22.8.

Preparation of Compound 3 from Boronic Ester 2b

To a 250 mL flask containing 1-isopropyl-5-(4,4,5,5-tetramethyl-1,3,2-dioxaborolan-2-yl)-1H-pyrazole 2b (1.23 g) and 8 mL of dioxane were added (2-chloropyridin-3-yl)methanol 1 (0.5 g), water (2.75 mL), trans-dichloro bis(triphenylphosphine)palladium(II) (0.05 g), and sodium bicarbonate (0.88 g). The mixture was heated under nitrogen at 82° C., and stirred until reaction was finished. The precipitate was filtered and washed with dioxane. The combined filtrates were concentrated to afford a light brown oil. The crude was purified on silica gel using ethyl acetate/heptane as eluent to give (2-(1-isopropyl-1 H-pyrazol-5-yl)pyridin-3-yl)methanol 3 (0,749 g, 99%).

Alternatively, the reaction can be carried out using the following procedure. To a flask containing 1-isopropyl-5-(4,4,5,5-tetramethyl-1,3,2-dioxaborolan-2-yl)-1H-pyrazole 2b (34.5 g) and 174 mL of dioxane were added (2-chloropyridin-3-yl)methanol 1 (15 g), water (45 mL), bis(di-tert-butyl(4-dimethylaminophenyl)phosphine)dichloropalladium(II) (0.105 g), and sodium bicarbonate (15 g). The mixture was heated under nitrogen at 82° C., and stirred until reaction was finished. The reaction mixture was cooled and the precipitate was filtered and washed with dioxane. The combined filtrates were concentrated to obtain a crude product that can be used directly in the next step. Conversion of said crude into the hydrochloride of compound 4 following the process disclosed below, yield 25.2 of 4·HCl (92%).

Preparation of Compound 4·HCl

ACS Med. Chem. Lett., 2017, 8(3), 321-326.

To a solution of compound 3 (7 g) in methylene chloride (70 mL) was added $SOC_2$ (4.91 mL) at 0° C. The reaction mixture was stirred at rt until reaction was finished. The mixture reaction was concentrated to dryness. The crude solid was suspended in toluene and concentrated to dryness. The process was repeated three times. The precipitate was isolated by filtration, dried to give a solid 3-(chloromethyl)-2-(1-isopropyl-1H-pyrazol-5-yl)pyridine hydrochloride 4 (7.63 g, 87%). 1H-NMR (400 MHz, $CDCl_3$) 13.57 (s, 1H), 8.75 (d, 1H), 8.23 (d, 1H), 7.65 (m, 1H), 7.62 (s, 1H), 6.59 (s, 1H), 4.73 (s, 2H), 4.42 (m, 1H), 1.33 (s, 6H). 13C-NMR (100 MHz, $CDCl_3$) 148.4, 147.6, 140.7, 137.8, 136.3, 134.0, 124.8, 107.1 50.4, 42.9, 22.6. UPLC purity 99.6%.

This reaction can be performed using toluene instead of methylene chloride.

The addition of $SOC_2$ can be also carried out at 20/25° C. or at 40° C.

Preparation of Compound 4 without Isolation of Compound 3

Alternatively, compound 4 was obtained from the crude mixture after reaction of compound 1 with either 2a or 2b.

The crude reaction mixture was cooled to 20/25° C. and filtered through a filter cake, or through a filter, and the resulting cake was washed with dioxane (2×3 ml/g of compound 1). The filtrates were concentrated to 10 ml/g of compound 1, water (5 L/g of compound 1) was added, and the mixture concentrated again to 10 ml/g of compound 1. Toluene (10 ml/g of compound 1) and commercial HCl (2 eq. with respect to compound 1) were added. The mixture was stirred, the aqueous layer was separated and washed with toluene. The pH in the aqueous layer was adjusted to 7/8 and the product was extracted with $CH_2Cl_2$ several times. The resulting organic layer was treated with carbon, dried by distillation of the methylene chloride and treated as indicated above to convert compound 3 into compound 4. A weight percent yield of 174.1% from compound 1 to compound 4 was obtained.

Synthesis of Voxelotor from Compound (1)
(Route A)

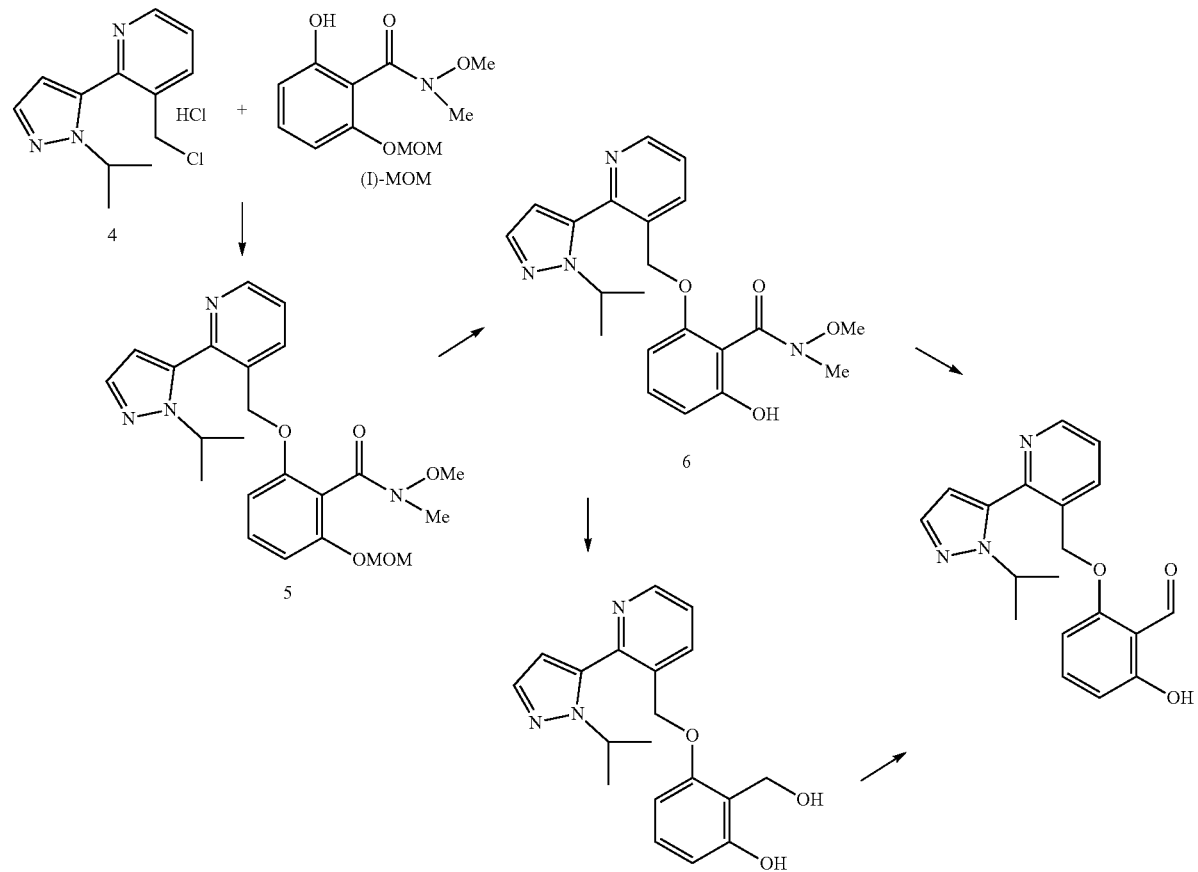

Preparation of Compound 5

A mixture of (I)-MOM (5.00 g), 3-(chloromethyl)-2-(1-isopropyl-1H-pyrazol-5-yl)pyridine hydrochloride 4 (6.19 g), and potassium carbonate (17.16 g) in DMF (35.0 mL) was heated at 60/65° C. and was stirred until reaction was finished. Water was added to the mixture (371 mL) and the product extracted with dichloromethane. The solvent was evaporated and the product purified by chromatography to yield compound 5 (9.20 g, 90%). 1H-NMR (400 MHz, CDCl$_3$) 8.61 (m, 1H), 8.01 (m, 1H), 7.57 (s, 1H), 7.33 (m, 1H), 7.16 (m, 1H), 6.77 (t, 1H), 6.42 (t, 1H), 6.34 (s, 1H), 5.16 (m 2H), 5.00 (m, 2H), 4.55 (m, 1H), 3.46 (s, 3H), 3.44 (s, 3H), 3.34 (s, 3H), 1.42 (d, 6H). UPLC purity 95.44%.

Preparation of Compound 6

Compound 5 (8.0 g) was dissolved in tetrahydrofuran (37 mL) at 25° C. Concentrated HCl (3.6 mL) was added and the mixture stirred until all the starting material disappeared. Sodium bicarbonate (7% aqueous solution, 55 mL) was added until neutral pH (6-8). The phases were separated, the aqueous phase was extracted with dichloromethane and the combined organic phases were washed with brine. The solvent was removed to afford compound 6 as a solid residue (6.1 g, 85%). 1H-NMR (400 MHz, DMSO) 8.70 (d, 1H), 8.00 (m, 1H), 7.52 (m, 2H), 7.07 (m, 1H), 6.56 (s, 1H), 6.53 (t, 1H), 6.38 (m, 1H), 5.00 (d, 2H), 4.65 (m, 1H), 3.52 (d, 3H), 3.1 (d, 3H), 1.35 (s, 6H).

Preparation of Voxelotor from Compound 6

LiAlH$_4$ (0.599 g) was suspended in tetrahydrofuran (25 mL) and cooled under nitrogen to −70° C. Compound 6 (2.5 g) in tetrahydrofuran (25 mL) was added to the LiAlH$_4$ suspension. The temperature was allowed to raise to 20° C. The reaction was quenched with ethyl acetate (2 mL) and water (15 mL), and dilute HCl was added until a pH<2 was reached (around 15 mL). The solvent was distilled to a final volume of 50 mL, cooled to 25° C. and filtered. 1.8 g (85%) of voxelotor THF solvate were obtained. 1H-NMR (400 MHz; CDCl$_3$) 11.92 (s, 1H), 10.36 (s, 1H), 8.73 (dd, 1H) 7.96 (dd, 1H), 7.58 (d, 1H), 7.40 (m, 1H), 6.55 (d, 1H), 6.33 (d, 1H), 6.25 (d, 1H), 5.07 (s, 2H), 4.65 (m, 1H), 1.46 (d, 6H). 13C-NMR (100 MHz, CDCl$_3$) 193.8, 163.9, 160.9, 149.7, 149.2, 138.5, 138.4, 137.8, 136.9, 131.2, 123.5, 111.0, 110.9, 107.2, 102.0, 67.4, 50.9, 22.9.

Preparation of Compound 8

A solution of compound 6 (1.0 g) in THF (10 mL) at 0° C. was treated with LAH (0.5 g). The reaction mixture was warmed to 20-50° C. and further stirred until the obtaining of the diol intermediate. The reaction was then quenched with water followed by extraction of the aqueous layer with methylene chloride. The combined organic layers were then washed with brine, and concentrated in vacuum to afford compound 8 (0.770 g). Whether necessary, the residue can be purified by chromatography.

Preparation of Voxelotor from compound 8

To a stirred solution of purified compound 8 (1.59 g) in DCM (16 mL) was added MnO$_2$ (4.05 g). The mixture was heated at 45° C. and stirred until reaction was finished. The mixture was cooled and filtered, washed with DCM. The filtrate was concentrated in vacuo and precipitated in heptane. The precipitate was filtered, washed with heptane, dried under high vacuum to give Voxelotor (1.2 g) as a solid. UPLC purity 99.5%.

Synthesis of Voxelotor from Compound (I'A) (Route A)

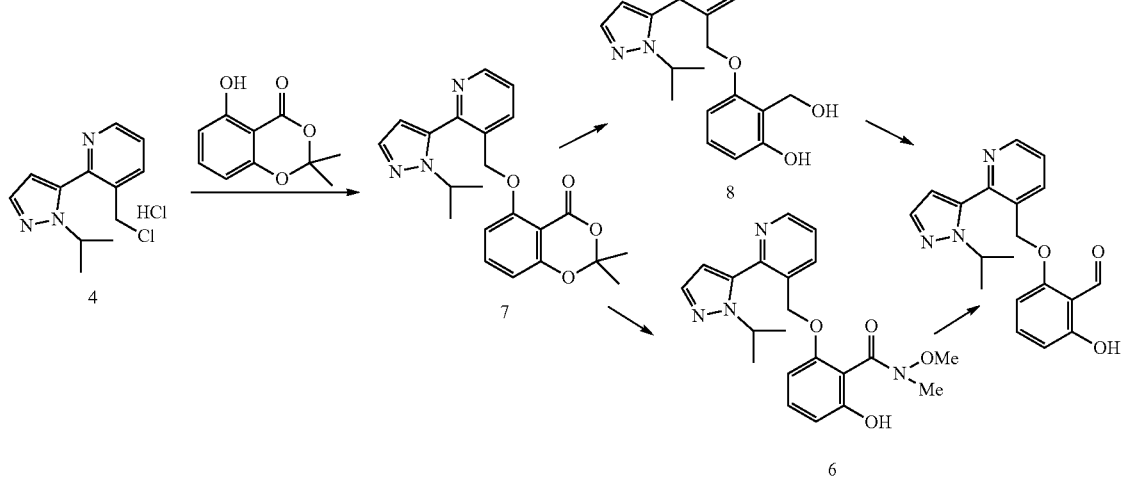

Preparation of Compound 7

A mixture of (I'A) (2.786 g), compound 4·HCl (3.8 g), and cesium carbonate (18.155 g) in DMF (26.6 mL) was heated at 60/65° C. and was stirred until reaction was finished. The mixture was cooled and added to water (75 mL) dropwise. The precipitate was filtered, washed with water, dried under high vacuo to give 5-((2-chloropyridin-3-yl)methoxy)-2,2-dimethyl-5-hydroxy-4-oxo-benzo-1,4-dioxin 7 (5.05 g, 92%) as a yellow solid. 1H-NMR (400 MHz, CDCl₃) 8.66 (d, 1H), 8.52 (d, 1H), 7.61 (s, 1H), 7.42 (m, 2H), 6.57 (d, 1H), 6.48 (d, 1H), 6.37 (d, 1H), 5.08 (s, 2H), 4.59 (m, 1H), 1.70 (s, 6H), 1.44 (d, 6H). 13C-NMR (100 MHz, CDCl₃) 159.7, 158.2, 158.0, 148.9, 147.8, 138.3, 138.1, 136.6, 136.5, 132.0, 123.9, 110.2, 106.8, 106.7, 105.6, 103.8, 67.3, 50.8, 25.7, 25.9.

Preparation of Compound 8

A solution of compound 7 (1.0 g) in THF (10 mL) at 0° C. was treated with LAH (0.193 g). The reaction mixture was warmed to room temperature and further stirred until reaction was finished. The reaction was then quenched with water followed by extraction of the aqueous layer with methylene chloride. The combined organic layer was then washed with brine, and concentrated in vacuo to give compound 8 (0.770 g, 89%). 1H-NMR (400 MHz; CDCl₃) 8.67 (d, 1H) 7.96 (d, 1H), 7.52 (d, 1H), 7.39 (s, 1H), 7.02 (d, 1H), 6.50 (d, 1H), 6.31 (s, 1H), 6.28 (s, 1H), 4.93 (m, 3H), 4.58 (s, 1H), 1.46 (d, 6H). 13C-NMR (100 MHz, CDCl₃) 157.8, 155.7, 149.1, 148.8, 138.4, 138.2, 137.1, 132.6, 129.0, 127.7, 113.6, 110.5, 107.2, 103.4, 67.1, 58.1, 51.0, 22.9. UPLC purity 93.75%

Preparation of Voxelotor from Compound 8

To a stirred solution of compound 8 (0.200 g) in DCM (3 mL) was added MnO₂ (1.01 g). The mixture was heated at 45° C. and stirred until reaction was finished. The mixture was cooled and filtered, washed with DCM. The filtrate was concentrated in vacuo and precipitated in heptane. The precipitate was filtered, washed with heptane, dried under high vacuo to give Voxelotor (0.150 g, 75%) as a solid.

Preparation of Compound 6

A three necked 500 mL flask was charged with compound 7 (5.0 g), THF (250 mL) and N,O-dimethylhydroxylamine hydrochloride (1.87 g). The temperature was adjusted to −25/−30° C. under inert atmosphere and isopropylmagnesium chloride (33.02 ml, 2.0M in THF) so that the temperature did not exceed −20° C. After completion of the reaction, 10% acetic acid was added and the temperature was allowed to reach 20/25° C. The layers were separated. The organic layer was washed with saturated NaCl solution (×2). The organic phase was concentrated and the residue purified by column chromatography (ethyl acetate/heptane) to provide 2.5 g (50%) of the compound 6.

Synthesis of Voxelotor from Compound (I'A) (Route B)

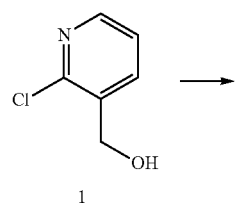

1

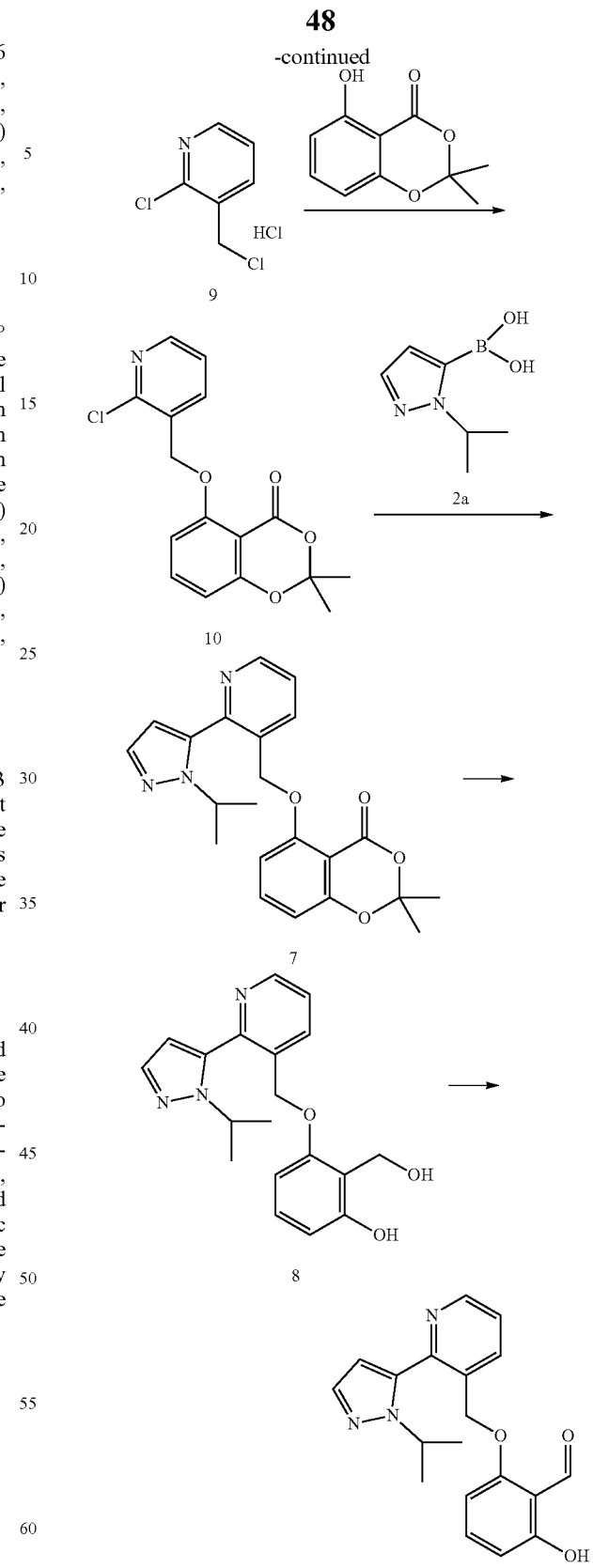

Preparation of Compound 9

SOCl₂ (8.13 mL) was added at rt to (2-chloropyridin-3-yl)methanol 1 (8 g) in DCM (80 mL). The reaction mixture was stirred at rt until the end of the reaction and concentrated to dryness. The crude solid was suspended in toluene and concentrated to dryness. The process was repeated three times and dried under vacuum to give an oil, 2-chloro-3-(chloromethyl)pyridine hydrochloride 9 (11.25 g), which was used in the next step without further purification.

Preparation of Compound 10

A mixture of (I'A) (5.038 g, 1.03 equiv), 2-chloro-3-(chloromethyl)pyridine hydrochloride 9 (5.0 g), and $K_2CO_3$ (13.9 g, 4 equiv) in DMF (37.5 mL) was heated at 60/65° C. and was stirred until reaction was finished. The mixture was cooled and added to water (250 mL) dropwise. The precipitate was filtered, washed with water, dried under high vacuo to give 5-((2-chloropyridin-3-yl)methoxy)-2,2-dimethyl-5-hydroxy-4-oxo-benzo-1,4-dioxin 10 (7.55 g, 94%) as a solid. 1H-NMR (400 MHz; $CDCl_3$) 8.50 (dd, 1H), 8.31 (dd, 1H), 7.47 (t, 1H) 7.34 (dd, 1H), 6.71 (d, 1H), 6.60 (d, 1H), 5.19 (s, 2H), 1.71 (s, 6H). 13C-NMR (100 MHz, $CDCl_3$) 159.5, 158.2, 158.0, 148.5, 147.9, 137.6, 136.7, 131.2, 123.3, 110.3, 106.5, 105.6, 103.6, 66.6, 25.7.

Preparation of Compound 7

To a 100 mL flask containing 1-isopropyl-1H-pyrazole-5-boronic acid 2a (3.85 g) and 32 mL of dioxane was added 5-((2-chloropyridin-3-yl)methoxy)-2,2-dimethyl-5-hydroxy-4-oxo-benzo-1,4-dioxin 10 (4.0 mg), water (10 mL), trans-dichloro bis(triphenylphosphine)palladium(II) (0.446 g), and sodium bicarbonate (3.14 g). The mixture was heated under nitrogen at 82° C., and stirred until reaction was finished (extra amounts of 1-isopropyl-1Hpyrazole-5-boronic acid 2a were added). The mixture was cooled and dioxane and water were added. Part of the solvent was removed on a rotavap at 40° C. under vacuum. The mixture was extracted with EtOAc and the organic layer was then washed with water. The combined filtrates were concentrated to afford a light brown oil of compound 7 (3.48 g, 70%). 1HNMR (400 MHz, $CDCl_3$) 8.66 (d, 1H), 8.52 (d, 1H), 7.61 (s, 1H), 7.42 (m, 2H), 6.57 (d, 1H), 6.48 (d, 1H), 6.37 (d, 1H), 5.08 (s, 2H), 4.59 (m, 1H), 1.70 (s, 6H), 1.44 (d, 6H). 13C-NMR (100 MHz, $CDCl_3$) 159.7, 158.2, 158.0, 148.9, 147.8, 138.3, 138.1, 136.6, 136.5, 132.0, 123.9, 110.2, 106.8, 106.7, 105.6, 103.8, 67.3, 50.8, 25.7, 25.9. UPLC purity 97.87%.

Preparation of Voxelotor

Compound 7 was converted into Voxelotor as disclosed above in Route A.

The invention claimed is:

1. A process for preparing Voxelotor

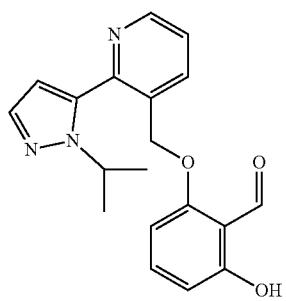 [SMILES: CC(C)n1nccc1-c1ncccc1COc1cccc(O)c1C=O]

or a salt or solvate thereof, comprising:

(a) reacting a compound of formula (I)

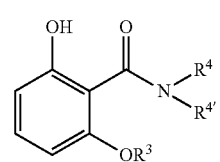

or a salt or solvate thereof, wherein $R^3$ represents hydrogen or a hydroxyl protecting group, $R^4$ and $R^{4'}$ are independently selected from $C_{1-6}$ alkyl and $C_{1-6}$ alkoxyl;

with a compound of formula (II)

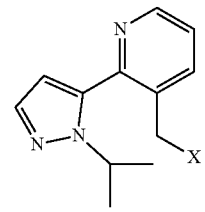

or a salt or solvate thereof, wherein X is selected from OH, Cl, Br, I, OTf, OTs and OMs;

to obtain a compound of formula (IV)

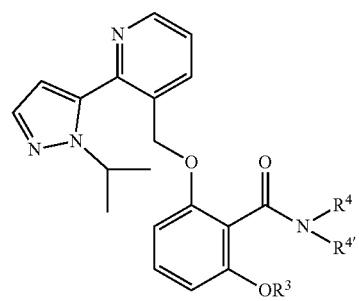

or a salt or solvate thereof, and (b) converting the compound of formula (IV), or a salt or solvate thereof, into Voxelotor or a salt or solvate thereof.

2. Process according to claim 1, wherein step (b) comprises:

reduction of the amide group in the compound of formula (IV), or a salt or solvate thereof, to the aldehyde; and if needed (if $R^3$ is a hydroxyl protecting group), cleaving the hydroxyl protecting group either before or after the step of reduction of the amide group.

3. Process according to claim 1, wherein the compound of formula (II), or a salt or solvate thereof, is obtained by a process comprising reacting a compound of formula (III)

(III)

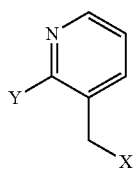

or a salt or solvate thereof, wherein
X is selected from OH, Cl, Br, I, OTf, OTs and OMs, and
Y is selected from Cl, Br, I, OTf and OMs;
with a compound of formula (VIII)

(VIII)

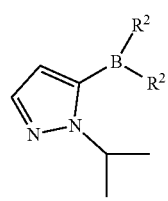

or a salt or solvate thereof, wherein each $R^2$ is independently selected from the group consisting of OH, $C_{1-6}$ alkyl, $C_{3-7}$ cycloalkyl, $C_{1-6}$ alkoxyl, or together they form a $C_{2-3}$ alkylenedioxy group optionally substituted by $C_{1-6}$ alkyl, or a benzyldioxy group optionally substituted by $C_{1-6}$ alkyl, or the $-B(R^2)_2$ group is $-BF_3K$.

4. Process according to claim 1, comprising:
reacting a compound of formula (III')

(III')

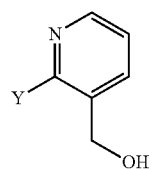

or a salt or solvate thereof, wherein Y is selected from Cl, Br, I, OTf and OMs;
with a compound of formula (VIII)

(VIII)

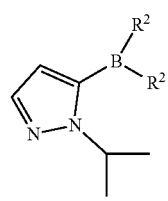

or a salt or solvate thereof, wherein each $R^2$ is independently selected from the group consisting of OH, $C_{1-6}$ alkyl, $C_{3-7}$ cycloalkyl, $C_{1-6}$ alkoxyl, or together they form a $C_{2-3}$ alkylenedioxy group optionally substituted by $C_{1-6}$ alkyl, or a benzyldioxy group optionally substituted by $C_{1-6}$ alkyl, or the $-B(R^2)_2$ group is $-BF_3K$;
to obtain a compound of formula (II')
or a salt or solvate thereof, (II')

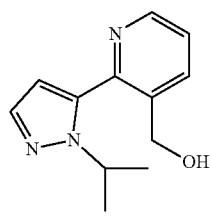

converting the compound of formula (II'), or a salt or solvate thereof, into a compound of formula (II")

(II")

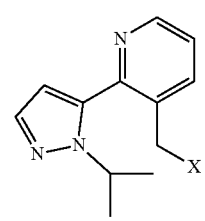

or a salt or solvate thereof, wherein X is selected from Cl, Br, I, OTf, OTs and OMs, preferably Cl;
reacting the compound of formula (II"), or a salt or solvate thereof, with a compound of formula (I)

(I)

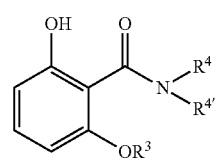

or a salt or solvate thereof, wherein
$R^3$ represents hydrogen or a hydroxyl protecting group, and
$R^4$ and $R^{4'}$ are independently selected from $C_{1-6}$ alkyl and $C_{1-6}$ alkoxyl;
to obtain a compound of formula (IV)

(IV)

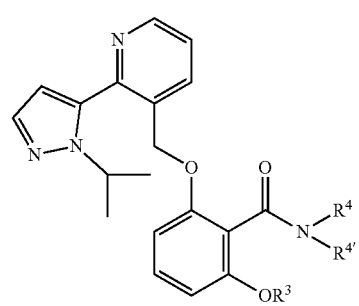

or a salt or solvate thereof; and
converting the compound of formula (IV), or a salt or solvate thereof, into Voxelotor or a salt or solvate thereof.

5. A process for preparing Voxelotor

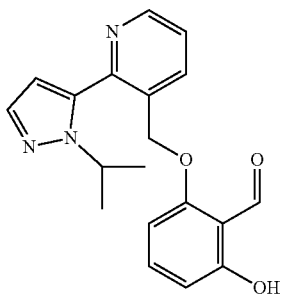 [SMILES: CC(C)n1nccc1-c1ncccc1COc1cccc(O)c1C=O]

or a salt or solvate thereof comprising:
(a) reacting a compound of formula (I)

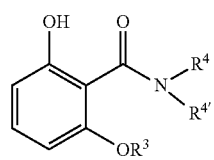

or a salt or solvate thereof, wherein
R³ represents hydrogen or a hydroxyl protecting group,
R⁴ and R⁴' are independently selected from $C_{1-6}$ alkyl and $C_{1-6}$ alkoxyl;
with a compound of formula (III)

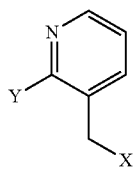

or a salt or solvate thereof, wherein
X is selected from OH, Cl, Br, I, OTf, OTs and OMs, and
Y is selected from Cl, Br, I, OTf and OMs;
to obtain a compound of formula (V)

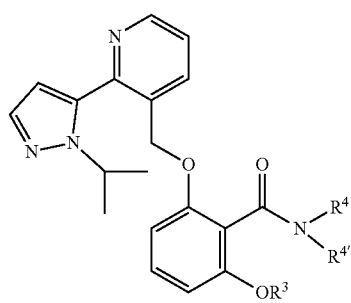

or a salt or solvate thereof,
(b) reacting the compound of formula (V), or a salt or solvate thereof, with a compound of formula (VIII)

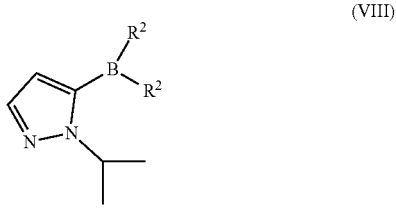

or a salt or solvate thereof, wherein each R² is independently selected from the group consisting of OH, $C_{1-6}$ alkyl, $C_{3-7}$ cycloalkyl, $C_{1-6}$ alkoxyl, or together they form a $C_{2-3}$ alkylenedioxy group optionally substituted by $C_{1-6}$ alkyl, or a benzyldioxy group optionally substituted by $C_{1-6}$ alkyl, or the —B(R²)₂ group is —BF₃K;
to provide a compound of formula (IV)

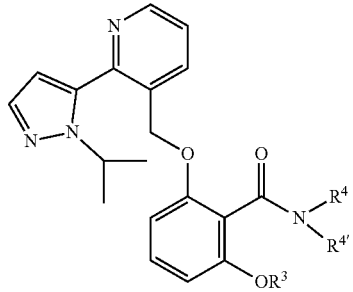

or a salt or solvate thereof, and
(c) converting the compound of formula (IV), or a salt or solvate thereof, into Voxelotor or a salt or solvate thereof.

6. Process according to claim 5, wherein step (c) comprises:
reduction of the amide group in the compound of formula (IV), or a salt or solvate thereof, to the aldehyde; and
if needed (if R³ is a hydroxyl protecting group), cleaving the hydroxyl protecting group either before or after the step of reduction of the amide group.

7. Process according to claim 3, wherein said reacting of a compound of formula (III), or a salt or solvate thereof, with a compound of formula (VIII), or a salt or solvate thereof, is carried out in the presence of Pd(amphos)Cl₂.

8. Process according to claim 4, wherein said reacting of a compound of formula (III'), or a salt or solvate thereof, with a compound of formula (VIII), or a salt or solvate thereof, is carried out in the presence of Pd(amphos)Cl₂.

9. Process according to claim 5, wherein said reacting of a compound of formula (V), or a salt or solvate thereof, with a compound of formula (VIII), or a salt or solvate thereof, is carried out in the presence of Pd(amphos)Cl₂.

* * * * *